(12) United States Patent
Bryan et al.

(10) Patent No.: US 7,224,882 B2
(45) Date of Patent: May 29, 2007

(54) OPTICAL MATERIALS WITH SELECTED INDEX-OF-REFRACTION

(75) Inventors: Michael A. Bryan, Oakland, CA (US); Nobuyuki Kambe, Menlo Park, CA (US)

(73) Assignee: NeoPhotonics Corporation, San Jose, CA (US)

( * ) Notice: Subject to any disclaimer, the term of this patent is extended or adjusted under 35 U.S.C. 154(b) by 307 days.

(21) Appl. No.: 10/620,176

(22) Filed: Jul. 15, 2003

(65) Prior Publication Data

US 2004/0105163 A1 Jun. 3, 2004

Related U.S. Application Data

(63) Continuation of application No. PCT/US02/01702, filed on Jan. 17, 2002.

(60) Provisional application No. 60/262,274, filed on Jan. 17, 2001, provisional application No. 60/262,273, filed on Jan. 17, 2001.

(51) Int. Cl.
  *G02B 6/00* (2006.01)
  *H01L 21/00* (2006.01)

(52) U.S. Cl. .......................... 385/141; 385/14; 385/37; 385/39; 385/129; 385/142; 385/144; 438/31; 438/32; 438/37

(58) Field of Classification Search ........ 385/123–132, 385/14, 37, 39, 141–142, 144; 430/321; 438/31–32, 37
See application file for complete search history.

(56) References Cited

U.S. PATENT DOCUMENTS

| 4,229,070 A | 10/1980 | Olshansky et al. |
|---|---|---|
| 4,439,008 A | 3/1984 | Joormann et al. |
| 4,474,427 A * | 10/1984 | Hill et al. .................... 385/123 |
| 4,514,053 A * | 4/1985 | Borrelli et al. ............. 359/569 |
| 4,907,864 A * | 3/1990 | Hagerty et al. ............. 359/653 |
| 6,160,944 A * | 12/2000 | Payne et al. ................ 385/129 |
| 6,174,828 B1 | 1/2001 | Morita et al. |
| 6,370,301 B1 * | 4/2002 | Kokura ........................ 385/37 |
| 6,542,690 B1 * | 4/2003 | Ellison et al. .............. 385/141 |
| 6,636,665 B1 * | 10/2003 | Sceats et al. ................. 385/37 |
| 2002/0048727 A1 * | 4/2002 | Zhou et al. ................. 430/290 |

OTHER PUBLICATIONS

International Search Report (PCT/US02/01702) dated Aug. 8, 2002.
International Preliminary Report PCT/US02/01702) dated Jun. 4, 2003.

* cited by examiner

*Primary Examiner*—Frank G. Font
*Assistant Examiner*—Michael P. Mooney
(74) *Attorney, Agent, or Firm*—Dardi & Associates, PLLC; Peter S. Dardi

(57) ABSTRACT

Photosensitive optical materials are used for establishing more versatile approaches for optical device formation. In some embodiments, unpatterned light is used to shift the index-of-refraction of planar optical structures to shift the index-of-refraction of the photosensitive material to a desired value. This approach can be effective to produce cladding material with a selected index-of-refraction. In additional embodiments gradients in index-of-refraction are formed using, photosensitive materials. In further embodiments, the photosensitive materials are patterned within the planar optical structure. Irradiation of the photosensitive material can selectively shift the index-of-refraction of the patterned photosensitive material. By patterning the light used to irradiate the patterned photosensitive material, different optical devices can be selectively activated within the optical structure.

21 Claims, 11 Drawing Sheets

OPTICAL MATERIALS WITH SELECTED INDEX-OF-REFRACTION

CROSS REFERENCE TO RELATED APPLICATIONS

This application claims priority to copending PCT application designating the U.S. serial No. PCT/US02/01702 filed on Jan. 17, 2002 to Bryan et al, entitled "Optical Material With Selected Index Of Refraction," incorporated herein by reference, which claims priority both to U.S. provisional patent application Ser. No. 60/262,274 to Bryan filed on Jan. 17, 2001, entitled "Optical Material With Selected Index Of Refraction," and to U.S. provisional patent application Ser. No. 60/262,273 to Bryan et al. filed on Jan. 17, 2001, entitled "Surface Cutting Of Silicon Oxide Wafers," with both provisional applications being incorporated herein by reference.

FIELD OF THE INVENTION

The invention relates to optical materials and corresponding optical structures incorporating a photosensitive optical material with an index-of-refraction that can be adjusted by irradiation with light of an appropriate frequency. The invention further relates to optical devices incorporating photosensitive optical materials and to method for processing optical materials to obtain a gradient in index-of-refraction and/or a selected index-of-refraction at desired locations within an optical material. In addition, the invention relates to the surface cutting of silicon oxide materials for the transfer of a layer of silicon oxide to a surface.

BACKGROUND OF THE INVENTION

Presently used optical communication light wavelengths are from 1.3 to 1.6 microns. Optical waveguides, in fiber or planar form, generally have dimensions many times the wavelength. Thus, optical structures can have dimensions from a few microns to about 100 microns depending on optical mode requirements and other factors. Optical transmission generally is based on transmission through a higher index-of-refraction material in a core that is surrounded by a lower index-of-refraction material called the cladding. Light is confined within the core material in appropriate geometries by total internal reflection at the dielectric interface for light propagating through the core. Long range optical communications generally are carried on optical fibers. However, manipulation of the optical signals involves optical devices that connect with the optical fibers. Planar structures can present optical devices in a more compact format.

An explosion of communication and information technologies comprising Internet based systems has motivated a worldwide effort to implement optical communication networks to take advantage of a large bandwidth available with optical communication. The capacity of optical fiber technology can be expanded further with implementation of Wavelength Division Multiplexing technology. With increasing demands, more channels are needed to fulfill the system functions.

Basic characteristics of optical materials comprise surface quality, uniformity and optical quality. Optical quality refers to small enough absorption and scattering loss to achieve desired levels of transmission. Optical quality also comprises the uniformity of optical properties, such as index-of-refraction, and bi-refringence properties. In addition, optical quality is affected by interface quality, such as the interface between the core layers and cladding layers. For silica ($SiO_2$) and several other materials, preferred forms for optical transmission are a glass, while for some other materials single crystal or polycrystalline forms may have the highest quality optical transmission.

Several approaches have been used and/or suggested for the deposition of the optical materials. These approaches comprise, for example, flame hydrolysis deposition, chemical vapor deposition, physical vapor deposition, sol-gel chemical deposition and ion implantation. Flame hydrolysis deposition involves the use of a hydrogen-oxygen flame to react gaseous precursors to form particles of the optical material as a coating on the surface of the substrate. Subsequent heat treatment of the coating can result in the formation of a uniform optical material, which generally is a glass material. Flame hydrolysis and forms of chemical vapor deposition have been successful in the production of glass for use as fiber optic elements and planar waveguides.

The introduction of different elements, either dopants or stoichiometric components, into desired compositions can be difficult. In particular, blending elements to form complex compositions for optical materials can be challenging. Further challenges can result if particular complex compositions are to be located at particular locations within a structure. In particular, coating approaches generally cover the entire layer with a specific composition.

Approaches have been developed for the production of highly uniform submicron and nanoscale particles by laser pyrolysis. Highly uniform particles are desirable for the fabrication of a variety of devices comprising, for example, batteries, polishing compositions, catalysts, and phosphors for optical displays. Laser pyrolysis involves an intense light beam that drives the chemical reaction of a reactant stream to form highly uniform particles following the rapid quench of the stream after leaving the laser beam. Laser pyrolysis has the advantage that a variety of different elements can be incorporated into the particle compositions.

SUMMARY OF THE INVENTION

In a first aspect, the invention pertains to a method for altering the index-of-refraction of an optical material. The method comprises irradiating a planar optical structure comprising a photosensitive material with light at a wavelength appropriate to shift the index-of-refraction of the photosensitive material. The light is not patterned.

In a further aspect, the invention pertains to a method for producing a gradient in index-of-refraction in an optical material comprising a photosensitive optical material. The method comprises irradiating the photosensitive optical material to create a light-induced gradient in index-of-refraction. In some embodiments, the irradiation is performed for a selected period of time with light having an intensity and wavelength that creates a gradient in index-of-refraction along the irradiation direction. In further embodiments, the photosensitive optical material comprises a gradient in composition of a dopant that contributes to the photosensitivity.

In another aspect, the invention pertains to a method for altering a pattern in index-of-refraction in an optical material. The method comprises irradiating with light at least a portion of an optical material wherein the portion of optical material comprises a composition variation resulting in a spatial pattern of photosensitive optical material. The absorption of the light shifts the index-of-refraction of the irradiated photosensitive optical material to produce an altered pattern of index-of-refraction.

In an additional aspect, the invention pertains to an optical structure comprising a photosensitive optical material. At least a portion of the photosensitive material has a light-induced index-of-refraction change that is not patterned.

In another aspect, the invention pertains to an optical structure comprising a photosensitive optical material with a light-induced gradient in index-of-refraction.

Also, the invention pertains to an optical structure comprising a pattern of photosensitive optical material. At least a portion of the photosensitive material has a light-induced shift in index-of-refraction.

Furthermore, the invention pertains to a method for fabricating a material in which the method comprises fracturing a silicon oxide material and transferring a layer of silicon oxide. The fracturing of the silicon oxide material is performed by implanting impurities within a silicon oxide material to form a fracture band with a thin transfer layer of silicon oxide above the fracture band. The transferring of the transfer layer to a substrate is performed by associating the substrate with the silicon oxide material at the transfer layer.

In a further aspect, the invention pertains to a method of cleaving a layer from a material. The method comprises implanting impurities within the material and directing light at the material. The implanting of impurities within the material forms a fracture band with a transfer layer above the fracture band at the surface of the material. The light directed at the material is primarily transmitted through the transfer layer and significantly absorbed by the impurities in the fracture band.

In an additional aspect, the invention pertains to a silicon oxide material having a fracture band of impurities below the surface of the material.

DETAILED DESCRIPTION OF THE INVENTION

Figure 1:
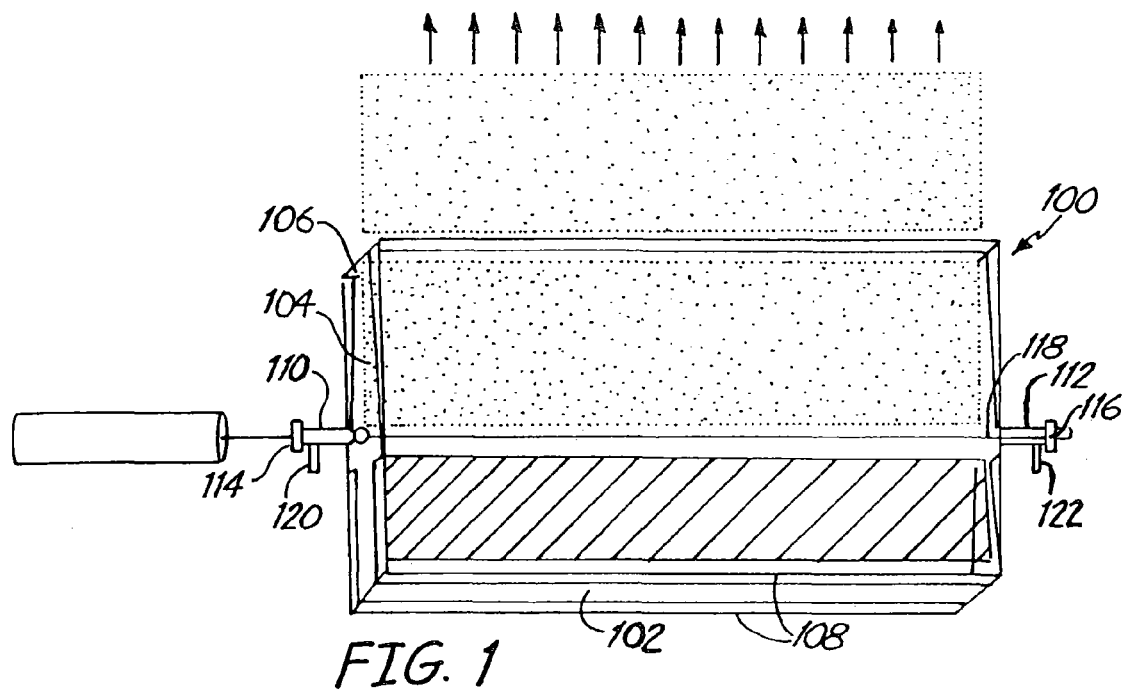
FIG. 1 is a side perspective view of a reaction chamber for performing laser pyrolysis synthesis of powders at high production rates.

Irradiation of photosensitive optical materials can be used to adjust the index-of-refraction of the optical material to form planar optical structures with desired index-of-refraction variation within the material. Specifically, advantageous adjustment of index-of-refraction in some embodiment can be accomplished without patterning the light. For example, an entire layer or a portion thereof of optical material can be irradiated, such as to form a cladding layer or the like with a selected index-of-refraction. In some embodiments, the luminosity of the irradiated light is selected to introduce gradients in the index-of-refraction without patterning the light. In addition, the photosensitive optical materials can be patterned such that irradiation with unpatterned light can introduce a pattern in the index-of-refraction of the material based on the pattern formed by the photosensitive material. By combining patterning of photosensitive optical material and selective irradiation of the optical material, alternative optical pathways and/or optical functionalities can be introduced into the resulting optical structure. The approaches described herein increase the versatility for manipulating optical materials and corresponding planar optical structures for the engineering of optical devices and integrated optical circuits.

Fiber optic communication networks provide broadband communication channels. However, manipulation of the optical signals requires the interface of the fiber optical pathways with appropriate optical devices and electro-optical devices. The formation of planar optical devices on a substrate surface has been used to decrease the size of the optical devices. The formation of planar optical devices involves the manipulation of optical materials to form structures in layers with dimension on the order of a micron to tens or hundreds of microns. Improved processes for the deposition of optical materials and/or the manipulation of optical materials in the formation of optical devices introduces the capability of producing more complex optical devices and integrated structures in more compact configurations.

Central to the formation of optical devices is the variation of the optical properties at different physical locations. For example, variation in index-of-refraction generally is used to confine light along a particular path or waveguide. Optical properties can be varied with changes in chemical composition and/or in physical properties, such as density. Some optical materials described herein are photosensitive such that irradiation with light at an appropriate wavelength induces an irreversible change in index-of-refraction. These photo-induced index-of-refraction changes can be advantageously used for the formation of optical structures with particular optical pathways and/or optical functionalities.

Optical materials with certain compositions were discovered to be photosensitive such that optical gratings, for example, in optical fibers, could be written into the material using patterned light, i.e., electromagnetic radiation. In particular, it has been observed that some oxides absorb ultraviolet light and undergo a shift in index-of-refraction. As an alternative to using ultraviolet light, intense green to blue light can be used in which a two-photon process yields the equivalent to ultraviolet absorption. One approach to the production of Bragg gratings is described in U.S. Pat. No. 5,367,588 to Hill et al., entitled "Method Of Fabricating Bragg Gratings Using A Silica Glass Phase Grating Mask And Mask Used By Same," incorporated herein by reference. Masks can also be used to pattern light in the formation of planar waveguides, as described in U.S. Pat. No. 5,841,928 to Maxwell et al., entitled "Planar Waveguides Made By Use Of Photosensitive Changes To The Refractive Index Of A Deposited Layer," incorporated herein by reference.

With respect to photosensitive materials, germania, i.e., germanium oxide, and germanium doped silicon oxide undergo permanent shifts in index-of-refraction upon absorption of ultraviolet light. Exposure to hydrogen has been found to increase the photosensitivity of germanium doped silicon oxide. Also, tin doped glasses have been found to exhibit large stable photosensitive index-of-refraction changes. Tin doped photosensitive optical materials are described further in U.S. Pat. No. 6,160,944 to Payne et al., entitled "Optical Waveguide Device," incorporated herein by reference. The degree of the shift depends on the composition of the material and the amount of exposure, i.e., total fluence. The photosensitive materials described herein generally can be any material with an index-of-refraction that is sensitive to exposure to light.

As described herein, significant processing advantages have been discovered to follow from the use of unpatterned light to alter the index-of-refraction of a photosensitive optical material. Unpatterned light can involve irradiation of an entire material surface or portion thereof. The characteristic feature of unpatterned light is that the light does not have intensity variations on the scale of dimensions confining the optical structures, such as the width or height of a waveguide. For example, the irradiation of half of the surface of a ten-centimeter diameter wafer does not involve patterns of the light on the scale of dimensions confining the optical features. While the methods described herein generally use light that is unpatterned, if the photosensitive material itself is patterned, it can be advantageous to also pattern the light to turn on or off specific optical pathways and/or functionalities.

Optical devices generally are formed to included confined optical pathways or waveguides that direct light. Optical circuits can include one or more optical devices that manipulate the light generally with passive waveguides directing the light within the circuit, such as to and from the optical devices. Optical waveguides and many optical devices include a core of material confined within a cladding. The core has a higher index-of-refraction than the surrounding cladding such that light is confined in the core by total internal reflection. In addition, for particular wavelengths of light, the difference in index-of-refraction between the core and cladding is selected to be within a particular range to confine the light while limiting the light to a single mode of transmission. Since planar optical materials are generally organized in layers, the cladding surrounding a particular waveguide/optical device can generally be considered as including an under-cladding in a layer below the core, an over-cladding in a layer above the core and cladding patterned within the same layer as the core to fill in the core layer around the core and other optical or non-optical devices within the layer. The cladding in the core layer may or may not be deposited during the formation of the over-cladding layer.

While the discussion herein focuses on planar optical devices, some of the embodiments relate to optical fibers and optical fiber preforms. Optical fibers are generally formed by pulling the optical fiber from a softened preform that introduces the basic structural and compositional aspects of the fiber. Optical fiber preforms can be produced using similar approaches for the formation of planar optical devices.

In some commercial embodiments, substrates with under-cladding layers are used for subsequent processing for the placement of waveguides and/or other optical devices. Generally, the index-of-refraction of the under-cladding should be matched to have a desired difference in index-of-refraction relative to the core material. Therefore, it is advantageous to be able to select the index-of-refraction of the under-cladding such that a particular under-cladding can be adjusted to function properly with a range of core materials. The entire under-cladding layer with photosensitive optical material can be irradiated to adjust the index-of-refraction to the under-cladding to a desired value based on particular core properties. Similarly, the over-cladding can be deposited with a composition that is photosensitive such that the index-of-refraction can be adjusted to a desired value without changing the chemical composition of the over-cladding. Using suitably intense light, all the cladding layers can be simultaneously irradiated to shift the index-of-refraction of the cladding material to desired values.

The shift in index-of-refraction due to irradiation depends on the characteristics of irradiation. If the absorption of the light by the photosensitive optical material is sufficiently high and/or if the intensity of light is sufficiently low, attenuation of the light can result in different illumination intensities at different depths within the photosensitive optical material. By irradiation for a selected period of time, a gradient in index-of refraction can be established perpendicular to the irradiation direction. Irradiation of an over-cladding layer in this way can establish a gradient perpendicular to the irradiation direction, generally the direction normal to the surface. Additionally or alternatively, the light can be scanned across the surface of the material with irradiation times adjusted to produce a gradient in index-of-refraction at specific locations along the surface. Gradients in the index-of-refraction of photosensitive material can also be introduced by forming the photosensitive material with a gradient in the dopant that provides the photosensitivity. The composition gradient can be in the x-y plane of a layer or in the z-direction perpendicular to the layer. Due to the gradient in the dopant of the photosensitive optical material, the index-of-refraction of the photosensitive material has a corresponding gradient after irradiation with uniform intensity light.

Forming a cladding with a lower index-of-refraction adjacent the core can reduce transmission loss of the core while preserving the single mode character of the core. The placement of a cladding with an index-of-refraction lower than the average index-of-refraction of the cladding can be accomplished with a gradient in index-of-refraction formed with photosensitive material. The placement of a lower index-of-refraction cladding adjacent a core material is described further in copending and commonly assigned U.S. patent application Ser. No. 10/027,906, now U.S. Pat. No. 6,952,504 to Bi et al., entitled "Three Dimensional Engineering of Optical Structures," incorporated herein by reference.

Efficient approaches have been developed for the patterning of optical compositions for the formation of optical materials, as described in detail below. For example, in the formation of a core layer, and optionally in the formation of cladding layers, the composition of the optical material can be varied to change the index-of-refraction and/or the other optical properties, for example, in the formation of active optical devices. The inclusion of a photosensitive material within a patterned optical structure provides the flexibility of selectively adjusting the index-of-refraction along the pattern of the photosensitive material after formation of the structure by irradiation with light of the appropriate wavelength.

The irradiation of the optical structure with the photosensitive material can select the index-of-refraction of the photosensitive material by a corresponding adjustment of the intensity, wavelength and duration of the irradiation. The entire optical structure can be irradiated with an intense light to approximately uniformly select the index-of-refraction of the optical material. In this way, functionality and/or directionality can be selected turned on or off following formation of the optical structure, for example, by changing the index-of-refraction of the photosensitive optical material such that it shifts from a cladding material to a core, i.e., optically transmitting, material within the optical structure.

In some embodiments involving patterned photosensitive optical material, the light can be selectively irradiated onto the optical structure and may be patterned. By selectively directing the light onto the optical material portions of the patterned photosensitive optical material and not other portions of the photosensitive optical material, the index-of-refraction of selected portions of the photosensitive optical material can be increased while leaving index-of-refraction of other portions of the photosensitive optical materials unchanged. Through the selective increase in index-of-refraction of some portion of the photosensitive optical material, the irradiated portion of the optical material can be converted from cladding material to core material for optical transmission. Thus, some optical pathways can be selected over alternative pathways. Selected optical pathways may involve optical or electo-optical functionalities that correspondingly become selected based on the particular portion of the optical structure irradiated with light. Thus, a particular optical structure can have alternative functionalities and/or pathways that can be selected following the manufacture of the device. This option provides considerable enhanced flexibility in device design. The ability to alter optical pathways after forming the material by selectively irradiating the photosensitive materials is analogous to the ability in electrical circuits to change functionality by cutting electrical contacts.

A new process has been developed involving reactive deposition driven by a radiation beam (e.g., a light beam), to form coatings with optical characteristics that are tightly controlled. The coating can be used to form optical structures with simple or complex collections of corresponding optical devices. In one embodiment, reactive deposition driven by a radiation beam (e.g., a light beam) involves a reactor with a flowing reactant stream that intersects a radiation beam proximate a reaction zone to form a product stream configured for the deposition of product particles onto a surface following formation of the particles in the flow. Radiation-based reactive deposition incorporates features of a radiation-based process for driving the reaction of a flowing reactant stream to form submicron powders into a direct coating process. When particle formation incorporates an intense light beam as the radiation source for the harvesting of particles, the radiation-based process for the production of submicron powders in a flow is known as laser pyrolysis. In particular, a wide range of reaction precursors can be used to generate a reactant stream with compositions in gas, vapor and/or aerosol form, and a wide range of highly uniform product particles can be efficiently produced. Reactant delivery approaches developed for laser pyrolysis can be adapted for radiation-based reactive deposition. For convenience, this application refers to radiation-based pyrolysis and laser pyrolysis interchangeably and to radiation-based reactive deposition and light reactive deposition interchangeably.

In laser pyrolysis, the reactant stream is reacted by an intense light beam, such as a laser beam, which heats the reactants at a very rapid rate. While a laser beam is a convenient energy source, other intense radiation (e.g., light) sources can be used in laser pyrolysis. Laser pyrolysis provides for formation of phases of materials that are difficult to form under thermodynamic equilibrium conditions. As the reactant stream leaves the light beam, the product particles are rapidly quenched. The reaction takes place in a confined reaction zone at the intersection of the light beam and the reactant stream. For the production of doped materials and other complex optical materials, the present approaches have the advantage that the composition of the materials can be adjusted over desirable ranges.

Submicron inorganic particles with various stoichiometries, non-stoichiometric compositions and crystal structures, including, for example, amorphous structures, have been produced by laser pyrolysis, alone or with additional processing, such as heat treatment. Specifically, amorphous and crystalline submicron and nanoscale particles can be produced with complex compositions using laser pyrolysis. Light reactive deposition can be used to form highly uniform coatings of glasses, i.e., amorphous materials, and crystalline materials (either single crystalline or polycrystalline), optionally with dopants comprising, for example, complex blends of stoichiometric and/or dopant components. Suitable optical materials include, for example, silicon oxide, germanium oxide, aluminum oxide, titanium oxide, telluride glasses, phosphate ($P_2O_5$) glass, InP, lithium niobate, combinations thereof and doped compositions thereof. Glasses have been generally used in optical applications, although crystalline aluminum oxide, e.g., sapphire, and crystalline $SiO_2$, e.g., quartz, may be suitable for optical applications at certain light wavelengths.

A basic feature of successful application of laser pyrolysis/light reactive deposition for the production of particles and corresponding coatings with desired compositions is generation of a reactant stream containing an appropriate precursor composition. In particular, for the formation of doped materials by light reactive deposition, the reactant stream can comprise host glass or crystal precursors and, optionally, dopant precursors. The reactant stream includes appropriate relative amounts of precursor compositions to produce the optical materials with the desired stoichiometries and dopant compositions. Also, unless the precursors are an appropriate radiation absorber, an additional radiation absorber is added to the reactant stream to absorb radiation/light energy for transfer to other compounds in the reactant stream. Other additional reactants can be used to adjust the oxidizing/reducing environment in the reactant stream. Formation of doped optical glasses with these reactive approaches can involve fewer processing steps than common commercial approaches for introducing dopants.

By adapting the properties of laser pyrolysis, light reactive deposition is able to deposit, highly uniform, very small particles in a coating. Due to the uniformity and small size of the powders, light reactive deposition can be used to form uniform and smooth coating surfaces. The desirable qualities of the particles are a result of driving the reaction with an intense light beam, which results in the extremely rapid heating and cooling. Using light reactive deposition, silicon oxide glass coatings following heating have been formed that have a root mean square surface roughness, as measured by atomic force microscopy, of about 0.25 to about 0.5 nm. Thus, the surfaces are smoother than are thought to be obtained by flame hydrolysis deposition and roughly comparable to smoothness obtainable by chemical vapor deposition. The smooth glass coating applied by light reactive deposition was deposited at relatively high deposition rates by moving the substrate through the product stream.

Light reactive deposition is able to produce quality coatings at much higher rates than previously available. At the same time, light reactive deposition is able to generate coatings with an extremely broad range of compositions by controlling reactant composition, reaction chemistry and reaction conditions, such as light intensity which can be used to continuously control effective temperatures in the reaction zone over a wide range, such as in the range(s) from about room temperature (e.g., 20° C.) to about 3000° C. Thus, light reactive deposition has already demonstrated the ability to be an efficient and effective approach for the formation of very high quality glass coatings.

Multiple layers can be formed by additional sweeps of the substrate through the product particle stream. Since each coating layer has high uniformity and smoothness, a large number of layers can be stacked while maintaining appropriate control on the layered structure such that optical devices can be formed throughout the layered structure without structural variation adversely affecting the ability to form optical devices. Composition can be varied between layers, i.e., perpendicular to the plane of the structure, and/or portions of layers, within the plane of the structure, to form desired optical structures. Thus, using light reactive deposition possibly with other patterning approaches, it is possible to form complex structures with intricate variation of materials with selectively varying compositions. Furthermore, by adapting laser pyrolysis techniques for the production of commercial quantities of powders, light reactive deposition can form high quality coatings at very rapid rates.

To form a uniform optical layer, a layer of amorphous particles deposited by light reactive deposition can be consolidated/densified. To consolidate the optical materials, the powders are heated to a temperature above their flow temperature. At these temperatures, the powders densify and upon cooling form a uniform layer of optical material. Substantially uniform optical materials have an optical quality that permits transmission of light. Incorporation of desired composition and/or dopants into the particles results in an optical material with a desired composition/dopants through the resulting densified optical material directly as a result of the powder deposition. Generally, amorphous particles can be consolidated to form a glass material, and crystalline particles, such as aluminum oxide, can be consolidated to form a crystalline material, such as sapphire. However, in some embodiments, appropriate heating and quenching rates can be used to consolidate an amorphous material into a crystalline layer, either single crystalline or polycrystalline, (generally slow quenching rates) and a crystalline powder into a glass layer (generally a rapid quench).

Passive and/or active optical devices can be incorporated into the optical structure to introduce the desired functionality. Optical devices of interest comprise, for example, optical waveguide devices, such as optical couplers, splitters, arrayed waveguide grating (AWG) and the like. Waveguides manufactured on a substrate surface are referred to as planar waveguides. Planar waveguides are useful in the production of integrated optical circuits for optical communication and other opto-electronics applications. Other optical devices of interest comprise, for example, three dimensional optical memory device, Bragg grating, optical attenuator, optical splitter/coupler, optical filter, optical switch, laser, modulator, interconnect, optical isolator, optical add-drop multiplexer (OADM), optical amplifier, optical polarizer, optical circulator, phase shifter, optical mirror/reflector, optical phase-retarder, and optical detector.

Integrated optical circuits generally comprise a plurality of optical devices that are optically connected. In a planar optical structure, a layer of optical material can include one or more optical circuits that form corresponding optical pathways along the layer. Due to improved processing ability of light reactive deposition, multiple layer optical structures with multiple layers having independent light pathways have been described. These multiple layered optical structures are described further in copending and commonly assigned PCT application PCT/US01/45762 designating the U.S. filed on Oct. 26, 2001, now U.S Pat. No. 7,039,264 to Bi et al., entitled "Multilayered Optical Structures," incorporated herein by reference. Furthermore, light reactive deposition can be adapted for full three-dimensional integration of optical structures to take advantage of composition variation in three dimensions. Thus, a monolithic optical structure can be formed with full integration within one or more layers and between layers to form a highly compact optical structure with the capability of complex functionality. The formation of three-dimensional structures is described further in copending and commonly assigned U.S. patent application Ser. No. 10/027,906, now U.S. Pat. No. 6,952,504 to Bi et al., entitled "Three Dimensional Engineering of Optical Structures," incorporated herein by reference. The index-of-refraction selection approaches described herein can be adapted in the formation of complex multilayered optical structures by designing the structures for light pathways to the photosensitive material for index-of-refraction selection or by performing the index-of-refraction selection on intermediate structures before all of the layers of the structure are deposited.

The index selection approaches described herein provide another significant tool in the designing and formation of both simple and complex optical structures. The approaches described herein can especially be helpful to provide the flexibility to alter optical materials after they are formed to select desired optical properties within the resulting optical structure.

Particle Deposition

In embodiments of particular interest, the optical layers are formed by light reactive deposition, although the photosensitive optical materials can be deposited by other approaches, such as flame hydrolysis, chemical vapor deposition and physical vapor deposition. In light reactive deposition, highly uniform flow of product particles is formed that are directed toward a substrate to be coated. The resulting particle coating can be formed into an optical material, such as a glass or crystal.

Light reactive deposition is a coating approach that uses an intense radiation source, e.g., light source, to drive synthesis of desired compositions from a flowing reactant stream. Light reactive deposition generally results in deposition of powders, although hot particles deposited on the surface can partly fuse during the deposition process due to their temperature. Generally, particles in a product flow, as described herein, can be solid particles, liquid particles and softened particles that have not cooled sufficiently to completely solidify. Light reactive deposition has similarities with laser pyrolysis for powder synthesis in that an intense radiation beam (e.g., a light beam) drives the reaction. Laser pyrolysis involves a flowing reactant stream that intersects with the radiation beam at a reaction zone where reaction products form particles. The reaction zone intersects the flow such that the reaction zone does not surround the reactant stream. Rather, the radiation beam is at an angle to the flow, for example, perpendicular to the flow or about parallel to the surface. While the particles produced in laser pyrolysis are collected for subsequent use, in light reactive deposition, the resulting compositions are directed to a substrate surface where a coating is formed. The characteristics of laser pyrolysis that can lead to the production of highly uniform particles can be correspondingly implemented in the production of coatings with high uniformity.

In light reactive deposition, the coating of the substrate can be performed in a coating chamber separate from the reaction chamber or the coating can be performed within the reaction chamber. In either of these configurations, the reactant delivery system can be configured similarly to a reactant delivery system for a laser pyrolysis apparatus for the production of particles with various compositions. Thus, a wide range of coatings can be formed for further processing into optical materials.

If the coating is performed in a coating chamber separate from the reaction chamber, the reaction chamber is essentially the same as the reaction chamber for performing laser pyrolysis, although the reactant throughput and the reactant stream size may be designed to be appropriate for the coating process. For these embodiments, the coating chamber and a conduit connecting the coating chamber with the reaction chamber replace the collection system of the laser pyrolysis system. If the coating is performed within the reaction chamber, a substrate intercepts flow from the reaction zone, directly capturing the particles onto its surface.

A laser pyrolysis apparatus design incorporating an elongated reactant inlet has been developed that facilitates production of commercial quantities of particles. Specifically, the reaction chamber and reactant inlet are elongated significantly along the light beam to provide for an increase in the throughput of reactants and products. By orienting the light beam along the elongated reactant stream, a sheet of product particles is generated. This design has been described in U.S. Pat. No. 5,958,348 to Bi et al., entitled "Efficient Production of Particles by Chemical Reaction," incorporated herein by reference.

Additional embodiments and other appropriate features for commercial capacity laser pyrolysis apparatuses are described in copending and commonly assigned U.S. patent application Ser. No. 09/362,631 to Mosso et al., entitled "Particle Production Apparatus," incorporated herein by reference. The delivery of gaseous/vapor reactants and/or aerosol reactants, as described further below, can be adapted for the elongated reaction chamber design. These designs for commercial production of powders by laser pyrolysis can be adapted for rapid coating of high quality optical materials by light reactive deposition. The size of the elongated reactant inlet can be selected based on the size of the substrate to be coated. In some embodiments, the reactant inlet is somewhat larger than the diameter or other dimension across the substrate, such as a width, such that the entire substrate can be coated in one pass through the product stream.

In general, the particle production apparatus with the elongated reaction chamber and reactant inlet is designed to reduce contamination of the chamber walls, to increase the production capacity and to make efficient use of resources. Due to the chamber design, the elongated reaction chamber can provide for an increased throughput of reactants and products without a corresponding increase in the dead volume of the chamber. The dead volume of the chamber can become contaminated with unreacted compounds and/or reaction products. Furthermore, an appropriate flow of shielding gas can confine the reactants and products within a flow stream through the reaction chamber. The high throughput of reactants makes efficient use of the radiation (e.g., light) energy.

With light reactive deposition, the rate of particle production for rapid coating can vary, for example, in the range(s) from about 1 gram per hour of reaction product to about 10 kilograms per hour of desired reaction product, although clearly lower rates are obtainable if desired. Not all of the particles generated are deposited on the substrate. In general the deposition efficiency depends on several factors including, for example, the relative speed of the substrate through the product stream with the particles, for embodiments based on moving the substrate through a sheet of product particles. Other factors affecting deposition efficiency include, for example, the particle composition, particle temperature and substrate temperature. At moderate relative rates of substrate motion, coating efficiencies of about 15 to about 20 percent have been achieved, i.e. about 15 to about 20 percent of the produced particles are deposited on the substrate surface. Routine optimization can increase this deposition efficiency further. At slower relative motion of the substrate through the product particle stream, deposition efficiencies of at least about 40% have been achieved and can be as high as 80% or more.

Alternatively or in addition, the invention provides that the rate of the movement of the substrate and the particle flow relative to each other can vary substantially, depending on the desired specifications for the coated substrate. Thus, in one embodiment, the rate can be measured on an absolute scale, and can vary in the range(s) of at least about 0.001 inches per second, in other embodiments at least about 0.05 inches per second, in further embodiments, from about 1 inch per second to about 12 inches per second, or even more. A person of ordinary skill in the art will recognize that additional ranges and subranges within these explicit ranges are contemplated and are encompassed within the present disclosure.

For appropriate embodiments using a sheet of product particles, the rate of relative substrate motion generally is a function of the selected deposition rate and the desired coating thickness as limited by the movement the substrate at the desired rate while obtaining desired coating uniformity. In embodiments in which the substrate is swept through the product particle stream, the substrate can be moved relative to a fixed nozzle, or the nozzle can be moved relative to a fixed substrate. Due to the high deposition rates achievable with light reactive deposition, extremely fast coating rates are easily achievable. These coating rates by light reactive deposition are dramatically faster than rates that are achievable by competing methods.

Furthermore, the rapid production rate can be advantageously used to form a plurality of particles coatings with or without consolidation between coatings. Each coating can cover an entire layer or a portion of a layer. Compositions can be changed within a layer or between layers. When changing compositions significantly between layers, it may be desirable to wait a few seconds for the product stream to stabilize.

The design of the elongated reaction chamber 100 for generating a sheet of product particles is shown schematically in FIG. 1. A reactant inlet 102 leads to main chamber 104. Reactant inlet 102 conforms generally to the shape of main chamber 104. Main chamber 104 comprises an outlet 106 along the reactant/product stream for removal of particulate products, any unreacted gases and inert gases. Shielding gas inlets 108 are located on both sides of reactant inlet 102. Shielding gas inlets are used to form a blanket of inert gases on the sides of the reactant stream to inhibit contact between the chamber walls and the reactants or products. The dimensions of elongated reaction chamber 104 and reactant inlet 102 can be designed for high efficiency particle production. Reasonable dimensions for reactant inlet 102 for the production of nanoparticles, when used with a $CO_2$ laser with a power in the several kilowatt range, are from about 5 mm to about 1 meter.

Tubular sections 110, 112 extend from the main chamber 104. Tubular sections 110, 112 hold windows 114, 116, respectively, to define a light beam path 118 through the reaction chamber 100. Tubular sections 110, 112 can comprise inert gas inlets 120, 122 for the introduction of inert gas into tubular sections 110, 112.

Outlet 106 can lead to a conduit directed to a coating chamber. A change in dimension does not necessarily demarcate a transition from the reaction chamber to a conduit to the coating chamber for appropriate embodiments. The reaction zone is located within the reaction chamber. The conduit can but does not necessarily involve a change in direction of the flow. Alternatively or additionally, a substrate can intercept the product flow to coat the substrate within the reactant chamber.

Figure 2:
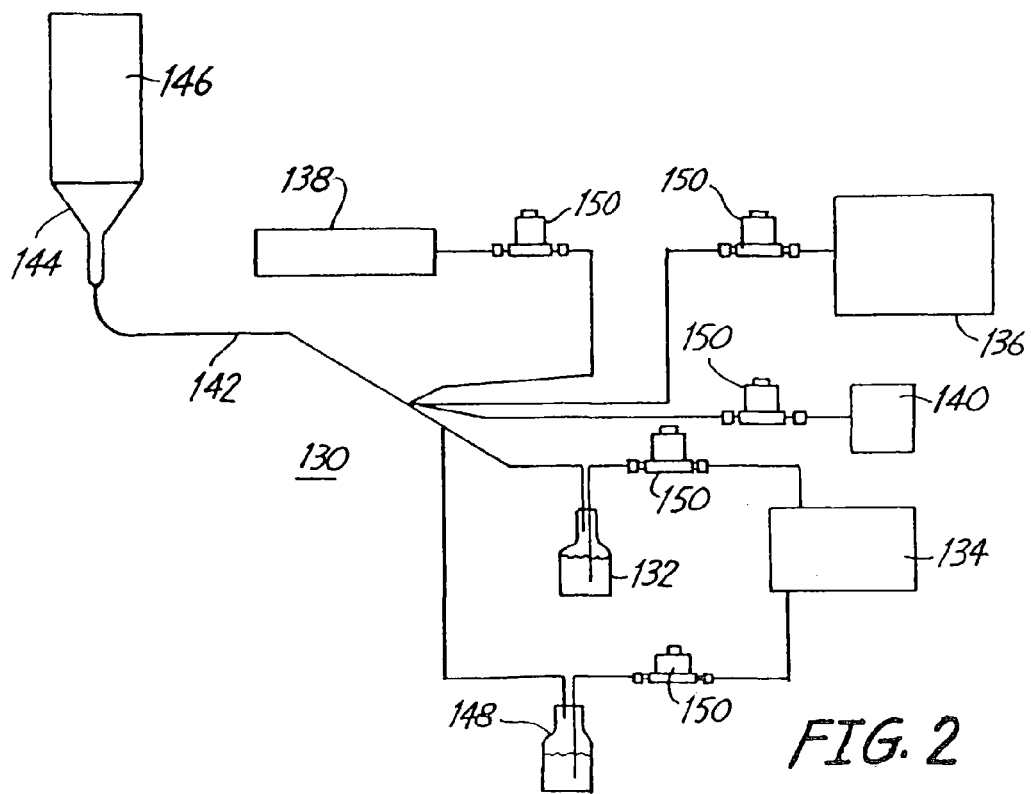
FIG. 2 is a schematic representation of a reactant delivery system for the delivery of vapor/gas reactants to a flowing reaction system, such as the laser pyrolysis reactor of FIG. 1.

Reactant inlet 102 is generally connected to a reactant delivery system. Referring to FIG. 2, an embodiment 130 of a reactant delivery apparatus comprises a source 132 of a precursor compound, which can be a liquid, solid or gas. For liquid or solid reactants, an optional carrier gas from one or more carrier gas sources 134 can be introduced into precursor source 132 to facilitate delivery of the reactant. Precursor source 132 can be a liquid holding container, a solid precursor delivery apparatus or other suitable container. The carrier gas from carrier gas source 134 can be, for example, either an infrared absorber, an inert gas or mixtures thereof.

The gases/vapors from precursor source 132 can be mixed with gases from infrared absorber source 136, inert gas source 138 and/or gaseous reactant source 140 by combining the gases/vapors in a single portion of tubing 142. The gases/vapors are combined a sufficient distance from the reaction chamber such that the gases/vapors become well mixed prior to their entrance into the reaction chamber. The combined gas/vapor in tube 142 passes through a duct 144 into channel 146, which is in fluid communication with a reactant inlet, such as 102 in FIG. 1.

An additional reactant precursor can be supplied as a vapor/gas from second reactant source 148, which can be a liquid reactant delivery apparatus, a solid reactant delivery apparatus, a gas cylinder or other suitable container or containers. As shown in FIG. 2, second reactant source 148 delivers an additional reactant to duct 144 by way of tube 142. Alternatively, second reactant source can deliver the second reactant into a second duct such that the two reactants are delivered separately into the reaction chamber where the reactants combine at or near the reaction zone. Thus, for the formation of complex materials and/or doped materials, a significant number of reactant sources and, optionally, separate reactant ducts can be used for reactant/precursor delivery. For example, as many as 25 reactant sources and/or ducts are contemplated, although in principle, even larger numbers could be used. Mass flow controllers 150 can be used to regulate the flow of gases/vapors within the reactant delivery system of FIG. 2. Additional reactants/precursors can be provided similarly for the synthesis of complex materials.

As noted above, the reactant stream can comprise one or more aerosols. The aerosols can be formed within the reaction chamber or outside of the reaction chamber prior to injection into the reaction chamber. If the aerosols are produced prior to injection into the reaction chamber, the aerosols can be introduced through reactant inlets comparable to those used for gaseous reactants, such as reactant inlet 102 in FIG. 1. For the formation of complex material, additional aerosol generators and/or vapor/gas sources can be combined to supply the desired composition within the reactant stream.

Figure 3:
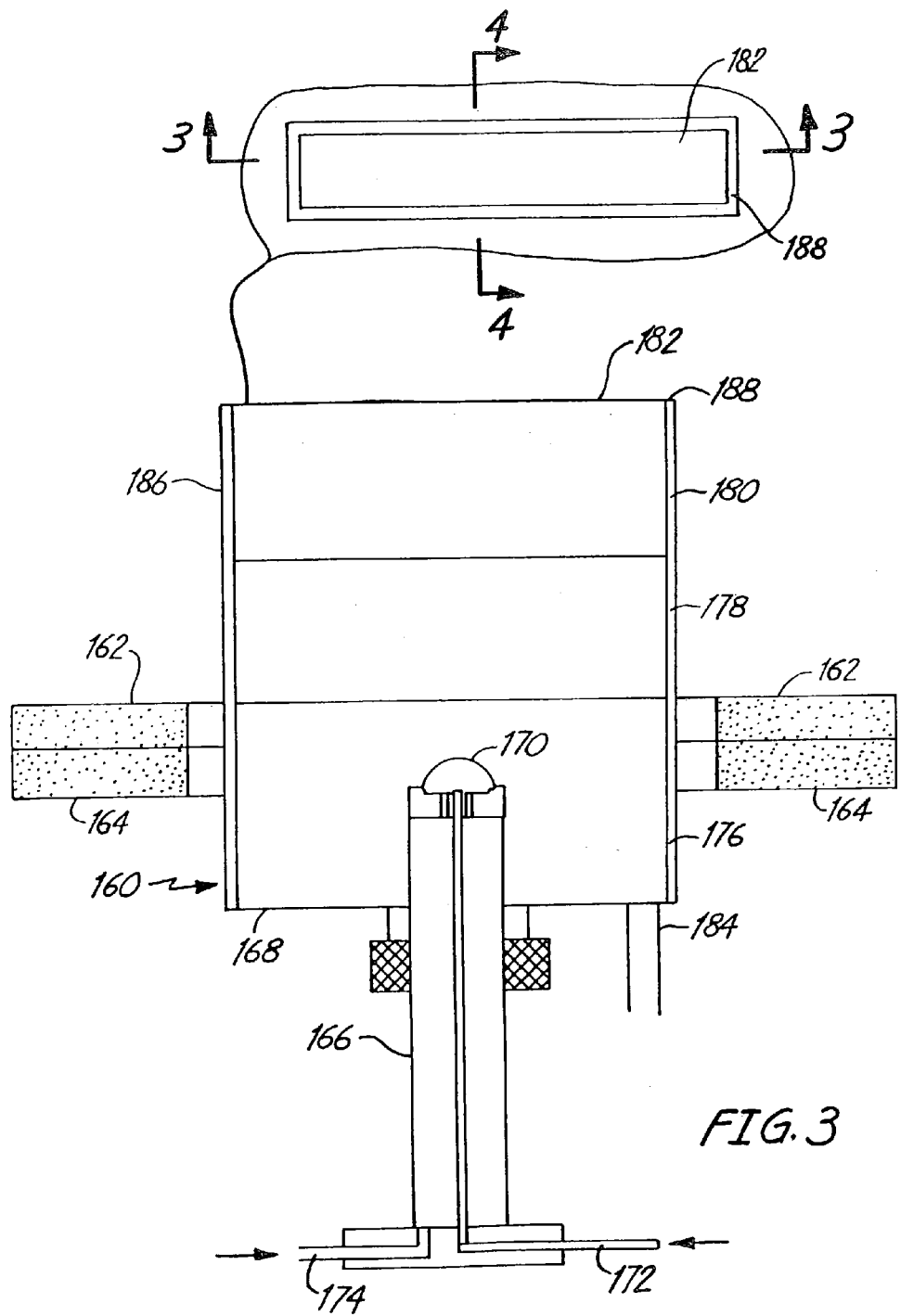
FIG. 3 is a sectional side view of a reactant inlet nozzle with an aerosol generator for the delivery of aerosol and gas/vapor compositions into a reaction chamber, wherein the cross section is taken along line 3—3 of the insert. The insert shows a top view of an elongated reactant inlet.
Figure 4:
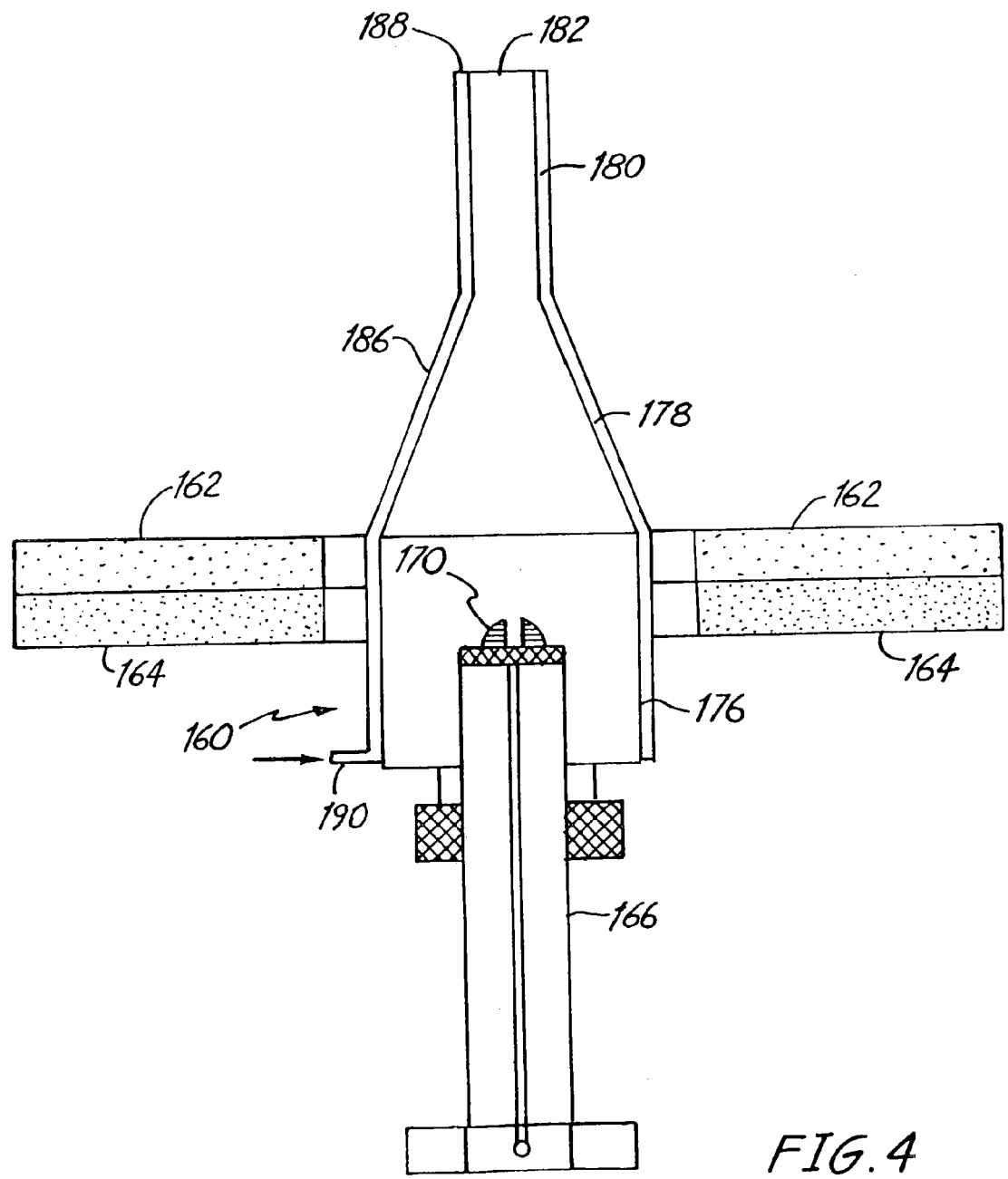
FIG. 4 is a sectional side view of the reactant inlet nozzle of FIG. 3 taken along the line 4—4 of the insert in FIG. 3.

An embodiment of a reactant delivery nozzle configured to deliver an aerosol reactant is shown in FIGS. 3 and 4. Inlet nozzle 160 connects with a reaction chamber at its lower surface 162. Inlet nozzle 160 comprises a plate 164 that bolts into lower surface 162 to secure inlet nozzle 160 to the reaction chamber. Inlet nozzle 160 comprises an inner nozzle 166 and an outer nozzle 168. Inner nozzle 166 can have, for example, a twin orifice internal mix atomizer 170 at the top of the nozzle. Suitable gas atomizers are available from Spraying Systems, Wheaton, Ill. The twin orifice internal mix atomizer 170 has a fan shape to produce a thin sheet of aerosol and gaseous compositions. Liquid is fed to the atomizer through tube 172, and gases for introduction into the reaction chamber are fed to the atomizer through tube 174. Interaction of the gas with the liquid assists with droplet formation.

Outer nozzle 168 comprises a chamber section 176, a funnel section 178 and a delivery section 180. Chamber section 176 holds the atomizer of inner nozzle 166. Funnel section 178 directs the aerosol and gaseous compositions into delivery section 180. Delivery section 180 leads to a rectangular reactant opening 182, shown in the insert of FIG. 3. Reactant opening 182 forms a reactant inlet into a reaction chamber for laser pyrolysis or light reactive deposition. Outer nozzle 168 comprises a drain 184 to remove any liquid that collects in the outer nozzle. Outer nozzle 168 is covered by an outer wall 186 that forms a shielding gas opening 188 surrounding reactant opening 182. Inert shielding gas is introduced through tube 190. Additional embodiments for the introduction of an aerosol with one or more aerosol generators into an elongated reaction chamber is described in U.S. Pat. No. 6,193,936 to Gardner et al., entitled "Reactant Delivery Apparatuses," incorporated herein by reference.

For the formation of oxides, suitable secondary reactants serving as an oxygen source comprise, for example, $O_2$, CO, $N_2O$, $H_2O$, $CO_2$, $O_3$ and mixtures thereof. Molecular oxygen can be supplied as air. Alternatively, oxygen can be provided in a metal/metalloid precursor compound, such as a carbonyl. Some sources of carbon for carbides, nitrogen for nitrides and sulfur for sulfides are described further below. A secondary reactant compound, if present, should not react significantly with the metal precursor prior to entering the reaction zone since this generally would result in the formation of large particles. However, reacting precursors can be delivered into the reactant chamber through separate nozzles such that the reactant do not combine until they are near the reaction zone.

Laser pyrolysis/light reactive deposition can be performed with a variety of optical frequencies, using either a laser or other strong focused light source, such as an arc lamp. Some desirable light sources operate in the infrared portion of the electromagnetic spectrum. $CO_2$ lasers are particularly convenient sources of light. Infrared absorbers for inclusion in the reactant stream comprise, for example, $C_2H_4$, water, isopropyl alcohol, $NH_3$, $SF_6$, $SiH_4$ and $O_3$. $O_3$ can act as both an infrared absorber and as an oxygen source. The radiation absorber, such as the infrared absorber, absorbs energy from the radiation beam and distributes the energy to the other reactants to drive the reaction.

Generally, the energy absorbed from the light beam increases the temperature at a tremendous rate, many times the rate that heat generally would be produced by exothermic reactions under controlled condition. While the process generally involves nonequilibriumn conditions, the temperature can be described approximately based on the energy in the absorbing region. In light reactive deposition, the reaction process is qualitatively different from the process in a combustion reactor where an energy source initiates a reaction, but the reaction is driven by energy given off by an exothermic reaction. In a combustion reactor, there is generally no well-defined reaction zone with a boundary. The reaction zone is large and the residence time of the reactants is long. Lower thermal gradients are generally present in the combustion reactor.

In contrast, the laser/light driven reactions have extremely high heating and quenching rates. The product compositions and particle properties generally depend on the laser power in the reactions zone and the quantity of radiation absorbers in the flow. By controlling the composition of the reactant flow and the light intensity in the reaction zone, the reaction product can be reproducibly controlled. The effective temperature in the reaction zone can be controlled over a wide range, for example, in the range(s) from about room temperature (e.g., 20° C.) to about 3000° C. In light reactive deposition, the reaction zone is primarily at the overlap of the light beam and the reactant stream, although the reaction zone may extend, for example, a few millimeters beyond the light beam, depending on the precise character of the reaction. After leaving the reaction zone in a radiation/light driven reactor, the particles may still be somewhat fluid/soft due to their temperature even if the reaction has terminated.

An inert shielding gas can be used to reduce the amount of reactant and product molecules contacting the reactant chamber components. Inert gases can also be introduced into the reactant stream as a carrier gas and/or as a reaction moderator. Appropriate inert shielding gases comprise, for example, Ar, He and $N_2$.

Laser pyrolysis apparatuses can be adapted for light reactive deposition. The nature of the adaptation depends on whether or not the coating is performed in the reaction chamber or within a separate coating chamber. In any of the embodiments, the reactant delivery inlet into the reaction chamber generally is configured to deliver a reactant stream with dimensions that results in a product stream with desired dimensions for the deposition process. For example, in some embodiments, the reactant inlet has a length approximately the same size or slightly larger than the diameter of a substrate such that the substrate can be coated along an entire dimension of the substrate with one pass through the product stream without wasting excessive amount of product.

Figure 5:
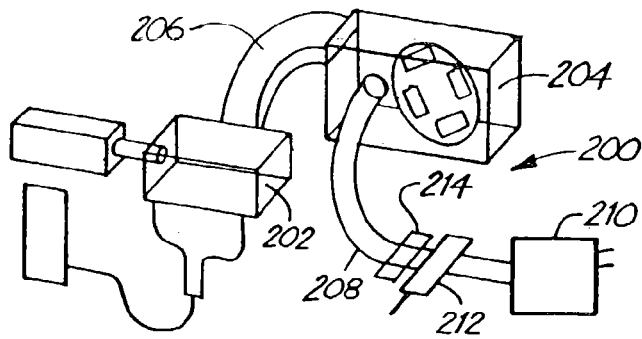
FIG. 5 is a schematic diagram of a light reactive deposition apparatus formed with a particle production apparatus connected to a separate coating chamber through a conduit.

The outlet of a laser pyrolysis apparatus can be adapted for the coating of substrates within a separate coating chamber. A coating apparatus with separate reaction chamber and coating chamber is shown schematically in FIG. 5. The coating apparatus 200 comprises a reaction chamber 202, a coating chamber 204, a conduit 206 connecting reaction chamber 202 with coating chamber 204, an exhaust conduit 208 leading from coating chamber 204 and a pump 210 connected to exhaust conduit 208. A valve 212 can be used to control the flow to pump 210. Valve 212 can be, for example, a manual needle valve or an automatic throttle valve. Valve 212 can be used to control the pumping rate and the corresponding chamber pressures. A collection system, filter, scrubber or the like 214 can be placed between the coating chamber 204 and pump 210 to remove particles that did not get coated onto the substrate surface.

Figure 6:
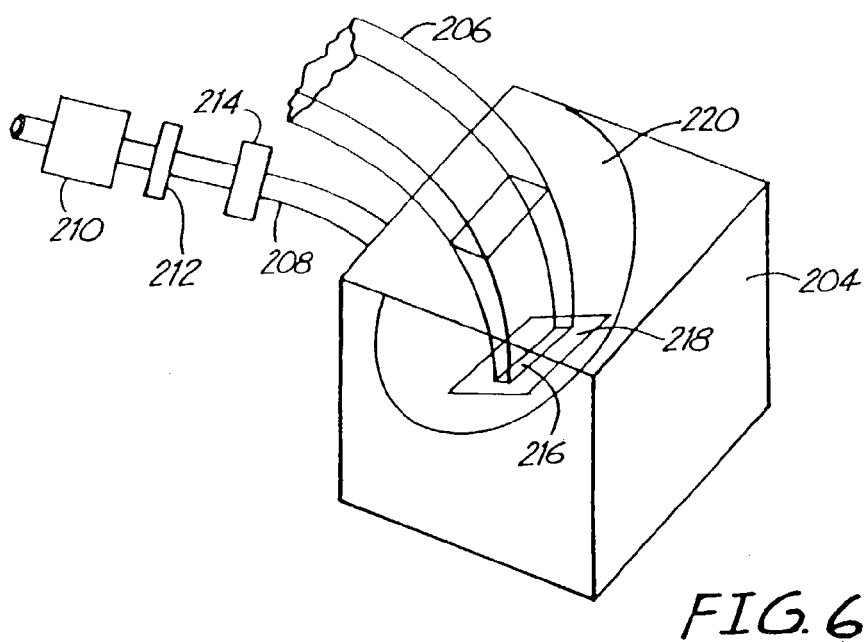
FIG. 6 is a perspective view of a coating chamber where the walls of the chamber are transparent to permit viewing of the internal components.

Referring to FIG. 6, conduit 206 from the particle production apparatus 202 leads to coating chamber 204. Conduit 206 terminates at opening 216 within chamber 204. In some embodiments, conduit opening 216 is located near the surface of substrate 218 such that the momentum of the particle stream directs the particles directly onto the surface of substrate 218. Substrate 218 can be mounted on a stage or other platform 220 to position substrate 218 relative to opening 216.

Figure 7:
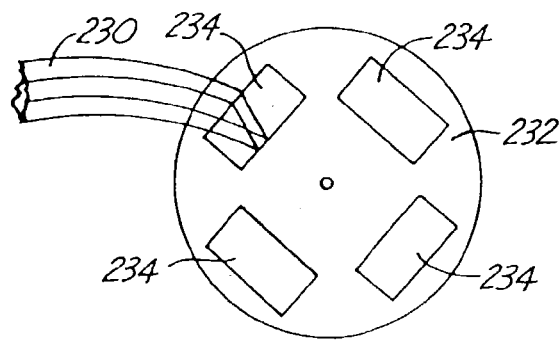
FIG. 7 is perspective view of a particle nozzle directed at a substrate mounted on a rotating stage.

An embodiment of a stage to position a substrate relative to the conduit from the particle production apparatus is shown in FIG. 7. A particle nozzle 230 directs particles toward a rotating stage 232. As shown in FIG. 7, four substrates 234 are mounted on stage 232. More or fewer substrates can be mounted on a moveable stage with corresponding modifications to the stage and size of the chamber. A motor is used to rotate stage 232. Other designs for a stage, conveyor or the like can be used to sweep the substrate through the product particle flow.

Movement of stage 232 sweeps the particle stream across a surface of one particular substrate 234 within the path of nozzle 230. Stage 232 can be used to pass sequential substrates through the product stream for one or more coating applications to each substrate. Stage 232 can comprise thermal control features that provide for the control of the temperature of the substrates on stage 232. Alternative designs involve the linear movement of a stage or other motions. In other embodiments, the particle stream is unfocused such that an entire substrate or the desired portions thereof is simultaneously coated without moving the substrate relative to the product flow.

If the coating is performed within the reaction chamber, the substrate is mounted to receive product compositions flowing from the reaction zone. The compositions may not be fully solidified into solid particles, although quenching may be fast enough to form solid particles. Whether or not the compositions are solidified into solid particles, the particles can be highly uniform. The distance from the reaction zone to the substrate can be selected to yield desired coating results.

Figure 8:
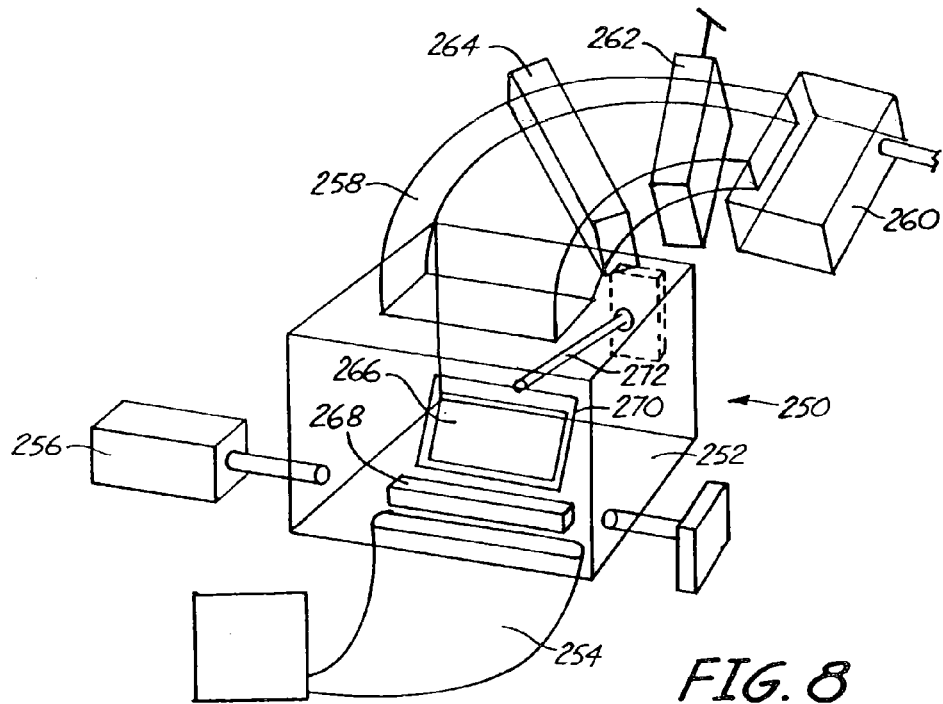
FIG. 8 is a schematic diagram of a light reactive deposition apparatus in which a particle coating is applied to a substrate within the particle production chamber.

An apparatus 250 to perform substrate coating within the reaction chamber is shown schematically in FIG. 8. The reaction/coating chamber 252 is connected to a reactant supply system 254, a radiation source 256 and an exhaust 258. Exhaust 258 can be connected to a pump 260, although the pressure from the reactant stream itself can maintain flow through the system. A valve 262 can be used to control the flow to pump 260. Valve 262 can be used to adjust the pumping rate and the corresponding chamber pressures. A collection system, filter, scrubber or the like 264 can be placed between chamber 252 and pump 260 to remove particles that did not get coated onto the substrate surface.

Substrate 266 can contact flow from a reaction zone 268 to coat the substrate with product particles/powders. Substrate 266 can be mounted on a stage, conveyor, or the like 270 to, sweep substrate 266 through the flow. Stage 270 can be connected to an actuator arm 272 or other motorized apparatus to move stage 270 to sweep the substrate through the product stream. Various configurations can be used to sweep the coating across the substrate surface as the product leaves the reaction zone. A shown in FIG. 8, actuator arm 272 translates stage 270 to sweep substrate 266 through the product stream.

Figure 9:
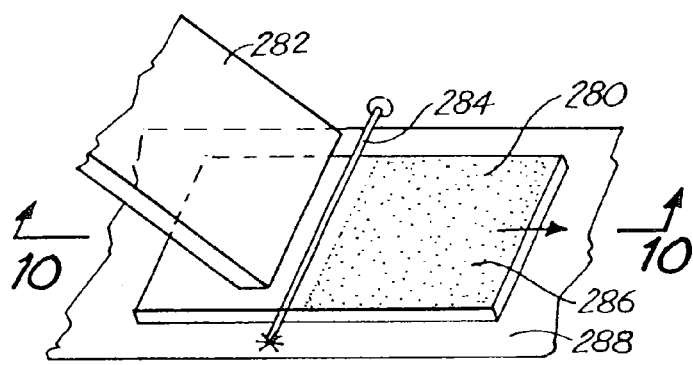
FIG. 9 is a perspective view of a reactant nozzle delivering reactants to a reaction zone positioned near a substrate.
Figure 10:
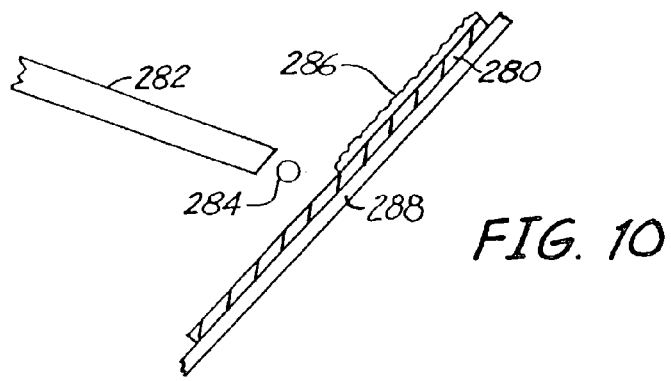
FIG. 10 is a sectional view of the apparatus of FIG. 9 taken along line 10—10.

A similar embodiment is shown in an expanded view in FIGS. 9 and 10. A substrate 280 moves relative to a reactant nozzle 282, as indicated by the right directed arrow. Reactant nozzle 282 is located just above substrate 280. An optical path 284 is defined by suitable optical elements that direct a light beam along path 284. Optical path 284 is located between nozzle 282 and substrate 280 to define a reaction zone just above the surface of substrate 280. The hot particles tend to attract to the cooler substrate surface.

Referring to FIGS. 9 and 10, a particle coating 286 is formed as the substrate is scanned past the reaction zone. In general, substrate 280 can be carried on a conveyor/stage 288. Conveyor/stage 288 can be connected to an actuator arm, as shown in FIG. 8. In alternative embodiments, rollers and a motor, a continuous belt conveyor, or any of a variety of design, comprising known designs, for translating a substrate can be used to carry the substrate.

In some embodiments, the position of conveyor 288 can be adjusted to alter the distance from substrate 286 to the reaction zone. Changes in the distance from substrate to the reaction zone correspondingly alter the temperature of the particles striking the substrate. The temperature of the particles striking the substrate generally alters the properties of the resulting coating and the requirements for subsequent processing, such as a subsequent heat processing consolidation of the coating. The distance between the substrate and the reaction zone can be adjusted empirically to produce desired coating properties. In addition, the stage/conveyor supporting the substrate can comprise thermal control features such that the temperature of the substrate can be adjusted to higher or lower temperatures, as desired.

Figure 11:
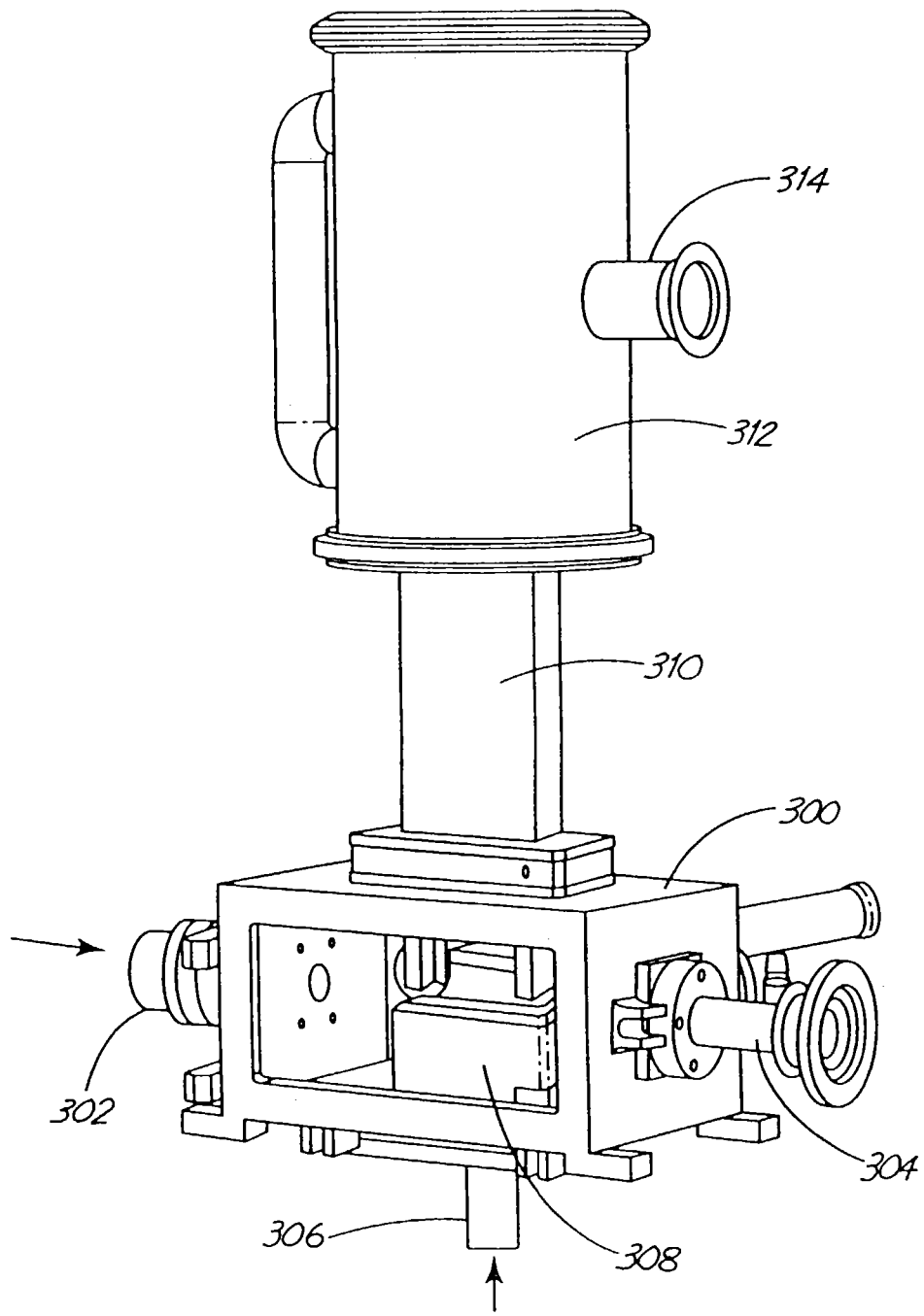
FIG. 11 is a perspective view of an embodiment of a light reactive deposition chamber.
Figure 12:
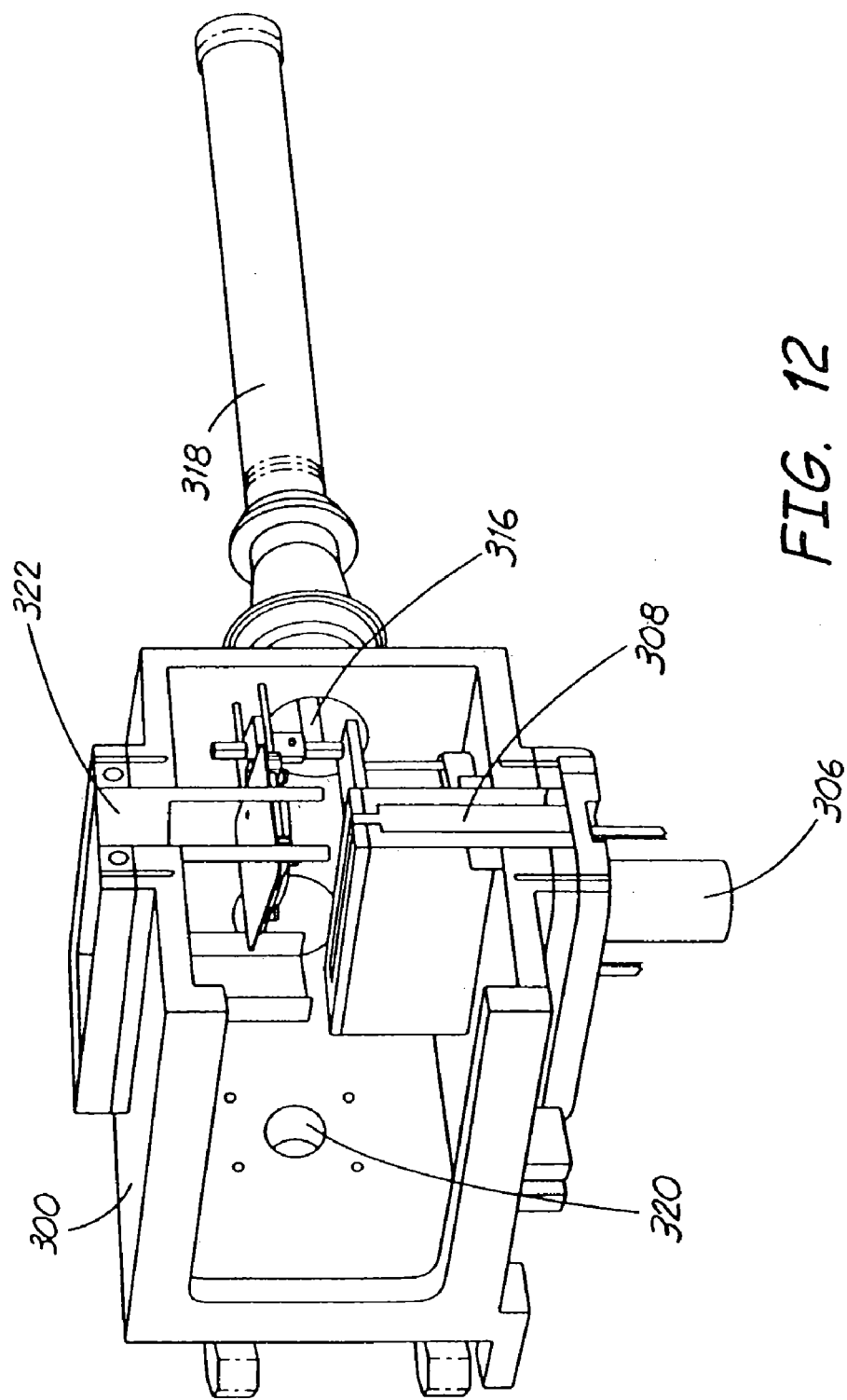
FIG. 12 is an expanded view of the reaction chamber of the light reactive deposition chamber of FIG. 11.
Figure 13:
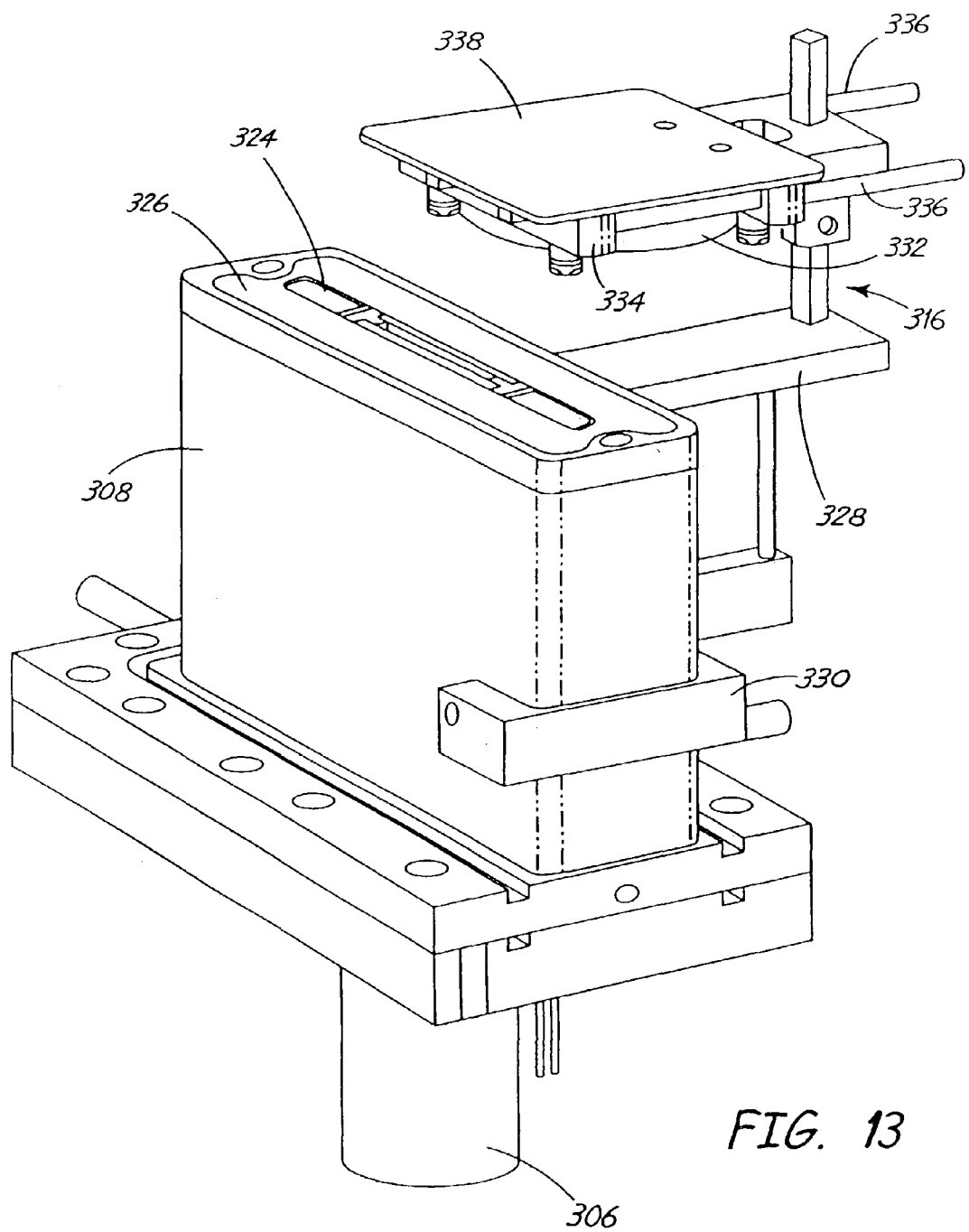
FIG. 13 is an expanded view of the substrate support of the reaction chamber of FIG. 12.

A particular embodiment of a light reactive deposition apparatus is shown in FIGS. 11–13. Referring to FIG. 11, process chamber 300 comprises a light tube 302 connected to a $CO_2$ laser (not shown) and a light tube 304 connected to a beam dump (not shown). An inlet tube 306 connects with a precursor delivery system that delivers vapor reactants and carrier gases. Inlet tube 306 leads to process nozzle 308. An exhaust tube 310 connects to process chamber 300 along the flow direction from process nozzle 308. Exhaust tube 310 leads to a particle filtration chamber 312. Particle filtration chamber 312 connects to a pump at pump connector 314.

An expanded view of process chamber 300 is shown in FIG. 12. A wafer carrier 316 supports a wafer above process nozzle 308. Wafer carrier 316 is connected with an arm 318, which translates the wafer carrier to move the wafer through the particle stream emanating from the reaction zone where the laser beam intersects the precursor stream from process nozzle 308. Arm 318 comprises a linear translator that is shielded with a tube. A laser entry port 320 is used to direct a laser beam between process nozzle 308 and the wafer. Unobstructed flow from process nozzle would proceed directly to exhaust nozzle 322, which leads to particle transport tube 310.

An expanded view of wafer carrier 316 and process nozzle 308 is shown in FIG. 13. The end of process nozzle 308 has an opening for precursor delivery 324 and a shielding gas opening 326 around precursor opening to confine the spread of precursor and product particles. Wafer carrier 316 comprises a support 328 that connects to process nozzle 308 with a bracket 330. A circular wafer 332 is held in a mount 334 such that wafer 332 slides within mount 334 along tracks 336 to move wafer 332 into the flow from the reaction zone. Backside shield 338 prevents uncontrolled deposition of particles on the back of wafer 332. Tracks 336 connect to arm 318.

The temperature of the substrate during the deposition process can be adjusted to achieve particular objectives. For example, the substrate can be cooled during the deposition process since a relatively cool substrate can attract the particles to its surface. However, in some embodiments, the substrate is heated, for example to about 500° C., during the deposition process. Particles stick better to a heated substrate. In addition, the particles tend to compact and fuse on a heated substrate such that a subsequent consolidation of the coating into a fused glass or other material is facilitated if the coating were formed initially on a heated substrate.

The formation of coatings by light reactive deposition, silicon glass deposition and optical devices in general are described further in copending and commonly assigned U.S. patent application Ser. No. 09/715,935 to Bi et al., entitled "Coating Formation By Reactive Deposition," incorporated herein by reference, and in copending and commonly assigned PCT application designating the U.S. serial No. PCT/US01/32413 to Bi et al. filed on Oct. 16, 2001, entitled "Coating Formation By Reactive Deposition," incorporated herein by reference.

The well-defined reactant stream as a sheet of flow leading into the reaction zone tends to spread after the reaction zone due to heat from the reaction. If the substrate is swept through the reaction zone near the reaction zone, the spreading of the flow may not be significant. In some embodiments, it may be desirable to sweep the substrate through the flow farther away from the reaction zone such that the flow has spread significantly and the entire substrate or desired portion thereof can be coated simultaneously without moving the substrate. The appropriate distance to obtain a uniform coating of particles depends on the substrate size and the reaction conditions. A typical distance of about 15 centimeters would be suitable for a wafer with a 4-inch diameter. Then, when the composition of the product particle flow is changed in time during the deposition process, the composition of the particles changes through the thickness of the coating. If the composition is changed continuously, a continuous composition gradient through the layer results. For optical materials, generally a continuous composition gradient layer having a continuous composition change from a first composition to a second composition has a thickness of no more than about 300 microns, in other embodiments no more than about 150 microns, in further embodiments, in the range(s) from about 500 nm to about 100 microns and in still other embodiments in the range(s) from about 1 micron to about 50 microns. A person of ordinary skill in the art will recognize that other ranges and subranges within the explicit ranges are contemplated and are encompassed within the present disclosure.

Alternatively, the composition can be changed incrementally or discretely to produce layers with varying composition, which can involve a gradual change in composition between two compositions or discrete layers with discrete composition differences. The resulting transition material has a step-wise change in composition from a first composition to a second composition. Generally, the first composition and second composition are the compositions of the adjacent layers such that the transition material provides a gradual transition in composition between the two adjacent layers. While an optical transition material can have two layers, the transition material generally has at least three layers, in other embodiments at least 4 layers and in further embodiments in the range(s) from 5 layers to 100 layers. A person of ordinary skill in the art will recognize that additional range(s) within these specific ranges are contemplated and are within the present disclosure. The total thickness generally is similar to the continuous gradient layers described in the previous paragraph. Each layer within the step-wise transition material generally has a thickness less than about 100 microns, in other embodiments less than about 25 microns, in further embodiments in the range(s) from about 500 nm to about 20 microns and in additional embodiments in the range(s) from about 1 micron to about 10 microns. The layers within the step-wise transition material may or may not have approximately equal thickness. Similarly, the step-wise change in composition may or may not take equivalent steps between layers of the transition material.

For the production of discrete optical devices or other structures on a substrate surface, the composition of the optical material generally must be different at different locations within the optical structure. To introduce the composition variation, the deposition process itself can be manipulated to produce specific structures. Alternatively, various patterning approaches can be used following the deposition.

Using the deposition approaches described herein, the composition of product particles deposited on the substrate can be changed during the deposition process to deposit particles with a particular composition at selected locations on the substrate to vary the resulting composition of the optical material along the x-y plane. Using light reactive deposition, the product composition can be varied by adjusting the reactants that react to form the product particle or by varying the reaction conditions. The reactant flow can comprise vapor and/or aerosol reactants, which can be varied to alter the composition of the products. In particular, dopant concentrations can be changed by varying the composition and/or quantity of dopant elements in the flow. The reaction conditions can also affect the resulting product particles. For example, the reaction chamber pressure, flow rates, radiation intensity, radiation energy/wavelength, concentration of inert diluent gas in the reaction stream, temperature of the reactant flow can affect the composition and other properties of the product particles.

While product particle composition changes can be introduced by changing the reactant flow composition or the reaction conditions while sweeping a substrate through the product stream, it may be desirable, especially when more significant compositional changes are imposed to stop the deposition between the different deposition steps involving the different compositions. For example, to coat one portion of a substrate with a first composition and the remaining portions with another composition, the substrate can be swept through the product stream to deposit the first composition to a specified point at which the deposition is terminated. The substrate is then translated the remaining distance without any coating being performed. The composition of the product is then changed, by changing the reactant flow or reaction conditions, and the substrate is swept, after a short period of time for the product flow to stabilize, in the opposite direction to coat the second composition in a complementary pattern to the first composition. A small gap can be left between the coatings of the first composition and the second composition to reduce the presence of a boundary zone with a mixed composition. The small gap can fill in during the consolidation step to form a smooth surface with a relatively sharp boundary between the two materials.

This process can be generalized for the deposition of more than two compositions and/or more elaborate patterns on the substrate. In the more elaborate processes, a shutter can be used to block deposition while the product flow is stabilized and/or while the substrate is being positioned. A precision controlled stage/conveyor can precisely position and sweep the substrate for the deposition of a particular composition. The shutter can be rapidly opened, and closed to control the deposition. Gaps may or may not be used to slightly space the different location of the compositions within the pattern.

In other embodiments, a discrete mask is used to control the deposition of particles. A discrete mask can provide an efficient and precise approach for the patterning of particles. With chemical vapor deposition and physical vapor deposition, a layer of material is built up from an atomic or molecular level, which requires binding of the mask at an atomic or molecular level to prevent migration of the material being deposited under the mask to blocked regions. Thus, the "masks" are a coating on the surface without an independent, self-supporting structure corresponding to the mask, and the "mask" is chemically or physically bonded to the surface with atomic level contact along the "mask". In contrast, with particle deposition, the particles generally can be at least macromolecular in size with diameters of about 3 nanometers (nm) or more such that a mask with a flat surface placed against another flat surface provides sufficient contact to prevent significant particle migration past the mask. The discrete masks have an intact self-supporting structure that is not bonded to the surface such that the mask can be removed intact from the surface that is coated. Therefore, the discrete mask approach herein is different from previous masking approaches adapted from photolithography for vapor deposition approaches.

The formation of the particle coating involves directing a product particle stream at the substrate shielded with the discrete mask. The discrete mask has a planar surface with openings at selected locations. The discrete mask blocks the surface except at the openings such that particles can deposit on the surface through the openings. Thus, the mask provides for patterning compositions on the surface by the selected placement of the openings. Suitable discrete masks comprise a mask with a slit that is narrower than the product particle flow such that the deposition process can be very precisely controlled. Movement of the slit can form a desired, precisely controlled pattern with one or more compositions. After use of a discrete mask, it can be removed and reused.

In some embodiments, a plurality of masks is used to deposit particles along a single layer. For example, following deposition of a pattern through a first mask, a second complementary mask can be used to deposit material over at least a portion of the surface left uncovered during deposition with the first mask. Further complementary masks can be used to form complex patterns while completing a single layer or portion thereof with a coating having varying chemical composition over the layer.

Thus, using light reactive deposition, a range of effective approaches are available to vary the chemical composition of optical materials within layers and in different layers to form three-dimensional optical structures with selected compositions are selected locations within the material. The patterning of compositions of optical materials during the deposition process is described further in copending and commonly assigned U.S. patent application Ser. No. 10/027, 906, now U.S. Pat. No. 6,952,504 to Bi et al., entitled "Three Dimensional Engineering of Optical Structures," incorporated herein by reference.

Compositions and Properties of Particles and Coatings

A variety of particles can be produced by laser pyrolysis/light reactive deposition. Adaptation of laser pyrolysis for the performance of light reactive deposition can be used to produce coatings of comparable compositions as the particles with selected compositions that can be produced by laser pyrolysis. Powders of particular interest comprise, for example, silicon particles, metal particles, and metal/metalloid compounds, such as, metal/metalloid oxides, metal/metalloid carbides, metal/metalloid nitrides, and metal/metalloid sulfides. For optical materials, some materials of particular interest comprise, for example, silicon oxide (silica), phosphate glasses, germanium oxide, InP, lithium niobate, telluride glasses, aluminum oxide, titanium oxide, combinations thereof and doped versions thereof The particles can be doped to alter the optical, chemical and/or physical properties of the particles. Generally, the powders comprise fine or ultrafine particles with particle sizes in the submicron or nanometer range. The particles may or may not partly fuse or sinter during the deposition.

Light reactive deposition is particularly suitable for the formation of highly uniform particles, especially nanoscale particles. In particular, light reactive deposition can produce a collection of particles of interest generally with an average diameter for the primary particles of less than about 500 nm, alternatively in the range(s) from about 3 nm to about 100 nm, similarly in the range(s) from about 3 nm to about 75 nm, and also in the range(s) from about 3 nm to about 50 nm. Persons of ordinary skill in the art will recognize that other ranges and subranges within these specific ranges are contemplated and are covered by the present disclosure.

Light reactive deposition, as described above, generally results in primary particles having a very narrow range of particle diameters. With aerosol delivery of reactants for light reactive deposition, the distribution of particle diameters can be particularly sensitive to the reaction conditions. Nevertheless, if the reaction conditions are properly controlled, a very narrow distribution of particle diameters can be obtained with an aerosol delivery system. However, with aerosol and/or vapor reactants broader distributions of primary particles sizes can also be obtained, if desired, by controlling the flow rates, reactant densities and residence times in light reactive deposition or using other flowing reaction systems.

In embodiments with highly uniform particles, effectively no primary particles have an average diameter greater than about 4 times the average diameter and in other embodiments 3 times the average diameter, and in further embodiments 2 times the average diameter. In other words, the particle size distribution effectively does not have a tail indicative of a small number of particles with significantly larger sizes. An effective cut off in the tail of the size distribution indicates that there are less than about 1 particle in $10^6$ have a diameter greater than a specified cut off value above the average diameter. Narrow size distributions, lack of a tail in the distributions and a roughly spherical morphology can be advantageous for obtaining highly uniform particle coatings and for highly uniform densified materials following consolidation.

Small particle size, spherical morphology and particle uniformity can contribute overall to the uniformity of the resulting coating, for example, with respect to composition as well as the smoothness of the surface and interfaces between materials. In particular, the lack of particles significantly larger than the average, i.e., the lack of a tail in the particle size distribution, leads to a more uniform coating. In addition, the particles can have a very high purity level.

Light reactive deposition can be performed with gas/vapor phase reactants Many metal/metalloid precursor compounds can be delivered into the reaction chamber as a vapor. Metalloids are elements that exhibit chemical properties intermediate between or inclusive of metals and nonmetals. Metalloid elements include, for example, silicon, boron, arsenic, antimony, and tellurium. While phosphorous is located in the periodic table near the metal elements, it is not generally considered a metalloid element. However, phosphorous in the form of $P_2O_5$ is a good glass former similar to some metalloid oxides, and doped forms of $P_2O_5$ can have desirable optical properties. For convenience, as used herein comprising in the claims, phosphorous is also considered a metalloid element. Appropriate metal/metalloid precursor compounds for gaseous delivery generally comprise metal compounds with reasonable vapor pressures, i.e., vapor pressures sufficient to get desired amounts of precursor gas/vapor into the reactant stream. The vessel holding liquid or solid precursor compounds can be heated to increase the vapor pressure of the metal precursor, if desired. Solid precursors generally are heated to produce a sufficient vapor pressure by sublimation or by melting the solid into a liquid.

A carrier gas can be bubbled through a liquid precursor to facilitate delivery of a desired amount of precursor vapor. Similarly, a carrier gas can be passed over the solid precursor to facilitate delivery of the precursor vapor. In other embodiments, the carrier gas is mixed with the precursor vapor before delivery into the reaction zone. As an example of suitable precursors for optical material formation, representative silicon precursors for vapor delivery comprise, for example, silicon tetrachloride ($SiCl_4$), trichlorosilane ($Cl_3HSi$), trichloromethyl silane $CH_3SiCl_3$, tetramethoxysilane ($Si(OCH_3)_4$) and tetraethoxysilane ($Si(OC_2H_5)_4$, also known as ethyl silane and tetraethyl silane).

Suitable dopants for silicon oxide materials include, for example, boron, germanium, phosphorous, titanium, tin, zinc and aluminum. Suitable boron precursors for gas/vapor delivery include, for example, boron trichloride ($BCl_3$), diborane ($B_2H_6$), tetraethoxyboride and $BH_3$. Suitable phosphorous precursors for gas/vapor delivery include, for example, phosphine ($PH_3$), tetraethoxyphosphide, phosphorus trichloride ($PCl_3$), phosphorus oxychloride ($POCl_3$) and $P(OCH_3)_3$. Suitable germanium precursors for gas/vapor delivery include, for example, tetraethoxygermanate, $GeCl_4$. Suitable titanium precursors for gas/vapor delivery include, for example, titanium tetrachloride ($TiCl_4$), and titanium isopropoxide ($Ti[OCH(CH_3)_2]_4$). Suitable tin precursors include, for example, $SnCl_4$ and liquid organometallic tin compounds such as ($C_4H_9$)$SnCl_3$ (n-butyl tin trichloride), ($CH_2CH$)$_2$ $SnCl_2$ (divinyl tin dichloride) and ($C_4H_9$)$_3$ $SnCl$ (tri-n-butyl tin chloride). Suitable liquid zinc precursor compounds for gas/vapor delivery include, for example, diethyl zinc ($Zn(C_2H_5)_2$) and dimethyl zinc ($Zn(CH_3)_2$). Suitable solid, zinc precursors with sufficient vapor pressure of vapor delivery include, for example, zinc chloride ($ZnCl_2$). Suitable liquid, aluminum precursors for gas/vapor delivery include, for example, aluminum s-butoxide ($Al(OC_4H_9)_3$). A number of suitable solid, aluminum precursor compounds are available including, for example, aluminum chloride ($AlCl_3$), aluminum ethoxide ($Al(OC_2H_5)_3$), and aluminum isopropoxide ($Al[OCH(CH_3)_2]_3$). Precursors for other dopants and host materials can be similarly selected based on analogy with these specific precursors.

The use of exclusively gas phase reactants is somewhat limiting with respect to the types of precursor compounds that can be used conveniently. Thus, techniques can be used to introduce aerosols containing reactant precursors to the reaction zone. Suitable aerosol delivery apparatuses adapted for performing light reactive deposition are described above.

Using aerosol delivery apparatuses, solid precursor compounds can be delivered by dissolving the compounds in a solvent. Alternatively, powdered precursor compounds can be dispersed in a liquid/dispersant for aerosol delivery. Liquid precursor compounds can be delivered as an aerosol from a neat liquid, a multiple liquid dispersion or a liquid solution. A solvent/dispersant can be selected to achieve desired properties of the resulting solution/dispersion. While a particular solvent/dispersant can be selected based on the precursors and other reaction parameters, suitable solvents/dispersants generally include, for example, water, methanol, ethanol, isopropyl alcohol, other organic solvents and mixtures thereof. The solvent should have a desired level of purity such that the resulting particles have a desired purity level. Some solvents, such as isopropyl alcohol, are significant absorbers of infrared light from a $CO_2$ laser such that no additional laser absorbing compound may be needed within the reactant stream if a $CO_2$ laser is used as a light source.

If aerosol precursors are used, the liquid solvent/dispersant can be rapidly evaporated by the light beam in the reaction chamber such that a gas phase reaction can take place. Thus, the fundamental features of the laser pyrolysis/light reactive deposition reaction may be unchanged by the presence of an aerosol. Nevertheless, the reaction conditions can be affected by the presence of the aerosol.

A number of suitable solid, metal precursor compounds can be delivered as an aerosol from solution. As an example of suitable aerosol precursors for optical materials, suitable silicon precursors for aerosol production comprise, for example, silicon tetrachloride $Si(Cl_4$), which is soluble in ether, and trichlorosilane ($Cl_3HSi$), which is soluble in carbon tetrachloride. Suitable silicon oxide dopants also can be delivered in an aerosol. Stannous chloride ($SnCl_2$) is soluble in alcohol. For example, zinc chloride ($ZnCl_2$) and zinc nitrate ($Zn(NO_3)_2$) are soluble in water and some organic solvents, such as isopropyl alcohol. Similarly, a boron dopant can be delivered as an aerosol using ammonium borate (($NH_4$)$_2B_4O_7$), which is soluble in water and various organic solvents. Precursors for other dopants and host materials can be similarly selected based on analogy with these specific precursors.

The precursor compounds for aerosol delivery can be dissolved in a solution generally with a concentration greater than about 0.1 molar. For a particular aerosol flow rate, the greater the concentration of precursor in the solution the greater the throughput of reactant through the reaction chamber. As the concentration increases, however, the solution can become more viscous such that the aerosol may have droplets with larger sizes than desired. Thus, selection of solution concentration can involve a balance of factors in the selection of a desired solution concentration.

Several different types of nanoscale particles have been produced by laser pyrolysis. Similar particles can be produced for light reactive deposition based on the description above. Such nanoscale particles for light reactive deposition can generally be characterized as comprising a composition comprising a number of different elements that are present in varying relative proportions, where the number and the relative proportions are selected based on the application for the nanoscale particles. Materials that have been produced (possibly with additional processing, such as a heat treatment) or have been described in detail for production by laser pyrolysis/light reactive deposition include, for example, amorphous $SiO_2$, doped $SiO_2$, crystalline silicon dioxide, titanium oxide (anatase and rutile $TiO_2$), $MnO$, $Mn_2O_3$, $Mn_3O_4$, $Mn_5O_8$, vanadium oxide, silver vanadium oxide, lithium manganese oxide, aluminum oxide ($\gamma$-$Al_2O_3$, delta-$Al_2O_3$ and theta-$Al_2O_3$), doped-crystalline and amorphous alumina, tin oxide, zinc oxide, rare earth metal oxide particles, rare earth doped metal/metalloid oxide particles, rare earth metal/metalloid sulfides, rare earth doped metal/metalloid sulfides, silver metal, iron, iron oxide, iron carbide, iron sulfide ($Fe_{1-x}S$), cerium oxide, zirconium oxide, barium titanate ($BaTiO_3$), aluminum silicate, aluminum titanate, silicon carbide, silicon nitride, and metal/metalloid compounds with complex anions, for example, phosphates, silicates and sulfates. In particular, many materials suitable for the production of optical materials can be produced by light reactive deposition. The production of particles by laser pyrolysis and corresponding deposition by light reactive deposition having ranges of compositions is described further in copending and commonly assigned U.S. patent application Ser. No. 10/027,906, now U.S. Pat. No. 6,952,504 to Bi et al., entitled "Three Dimensional Engineering of Optical Structures," incorporated herein by reference.

Submicron and nanoscale particles can be produced with selected dopants using laser pyrolysis and other flowing reactor systems. Amorphous powders and glass layers can be formed with complex compositions comprising a plurality of selected dopants. The powders can be used to form optical materials and the like. The glass layers can be formed by directly depositing a uniform particle coating using light reactive deposition and subsequently consolidating the powder into a uniform glass layer. Amorphous submicron and nanoscale powders and glass layers with dopants, such as rare earth dopants and/or other metal dopants, are described further in copending and commonly assigned U.S. Provisional Patent Application Ser. No. 60/313,588 to Home et al., entitled "Doped Glass Materials," incorporated herein by reference.

The dopants can be introduced at desired stoichiometries by varying the composition of the reactant stream. The dopants are introduced into an appropriate host glass forming material. By appropriately selecting the composition in the reactant stream and the processing conditions, submicron particles incorporating one or more metal or metalloid elements as glass-forming hosts with selected dopants, including, for example, rare earth dopants and/or complex blends of dopant compositions, can be formed. Since the host amorphous materials generally are oxides, an oxygen source should also be present in the reactant stream. The conditions in the reactor should be sufficiently oxidizing to produce the oxide materials.

Dopants can be introduced to vary properties of the amorphous particles and/or a resulting glass layer. For example, dopants can be introduced to change the index-of-refraction of the glass. For optical applications, the index-of-refraction can be varied to form specific optical devices that operate with light of a selected frequency range. Dopants can also be introduced to alter the processing properties of the material. In particular, some dopants change the flow temperature, i.e., the glass transition temperature, such that the glass can be processed at lower temperatures. In particular, boron and phosphorous dopants can help to lower the viscosity and therefore the flow temperature of silicon oxide. Lowering the flow temperature can be desirable for reducing stress and the attendant birefringence and for improving the consolidation of multiple layers where lower flow temperature materials are placed on top of existing coatings. Boron dopants also lower the index-of-refraction while phosphorous dopants raise the index-of-refraction. Dopants can also interact within the materials. For example, some dopants are introduced to increase the solubility of other dopants.

Particles of interest comprise amorphous compositions that form optical glasses with a plurality of dopants such that the various properties can be selected as desired. In some embodiments, the one or plurality of dopants are rare earth metals or rare earth metals with one or more other dopant elements. Rare earth metals comprise the transition metals of the group IIIb of the periodic table. Specifically, the rare earth elements comprise Sc, Y and the Lanthanide series. Other suitable dopants comprise elements of the actinide series. For optical glasses, the rare earth metals of particular interest as dopants comprise, for example, Ho, Eu, Ce, Tb, Dy, Er, Yb, Nd, La, Y, Pr and Tm. Generally, the rare earth ions of interest have a +3 ionization state, although $Eu^{+2}$ and $Ce^{+4}$ are also of interest. Rare earth dopants can influence the optical absorption properties that can alter the application of the materials for the production of optical amplifiers and other optical devices. Suitable non-rare earth metal dopants for optical glasses comprise, for example, Bi, Sb, Zr, Pb, Li, Na, K, Ba, B, Ge, W, Ca, Cr, Ga, Al, Mg, Sr, Zn, Ti, Ta, Nb, Mo, Th, Cd and Sn.

In addition, suitable metal oxide dopants for aluminum oxide for optical glass formation comprise cesium oxide ($Cs_2O$), rubidium oxide ($Rb_2O$), thallium oxide ($Tl_2O$), lithium oxide ($Li_2O$), sodium oxide ($Na_2O$), potassium oxide ($K_2O$), beryllium oxide (BeO), magnesiun oxide (MgO), calcium oxide (CaO), strontium oxide (SrO) and barium oxide (BaO). Aluminum oxide dopants can affect, for example, the index-of-refraction, consolidation temperature and/or the porosity of the glass. Suitable metal oxide dopants for infrared emitters comprise, for example, cobalt oxide ($Co_3O_4$), $Er_2O_3$, $CrO_2$, $Tm_2O_3$, $Nd_2O_3$, $Yb_2O_3$, $Pr_2O_3$, $Dy_2O_3$, and $Ho_2O_3$.

Material processing remains a significant consideration in the design of desired optical devices. For example, the composition and properties, such as density, of a material are adjusted to obtain materials with a desired index-of-refraction. Similarly, the thermal expansion and flow temperatures of a material have to be consistent with a reasonable processing approach for forming the materials into a monolithic, integrated structure without excessive stress that can introduce undesirable optical properties such as unintentional birefringence. The consolidated optical materials can provide high transparency and homogeneity at the operating wavelength such that light transmission through the materials does not result in undesirable amount of loss. In addition, the materials have to be processable under reasonable conditions to form the integrated devices of integrated optical circuits or electro-optical circuits.

To obtain particular objectives, the features of the coating can be varied with respect to composition of layers of the powders as well as location of materials on the substrate. Generally, to form an optical device the uniform optical material can be localized to a particular location on the substrate. In addition, multiple layers of particles can be deposited in a controlled fashion to form layers with different compositions and/or optical properties. Similarly, the coating can be made a uniform thickness, or different portions of the substrate can be coated with different thicknesses of particles. Different coating thicknesses can be applied such as by varying the sweep speed of the substrate relative to the particle nozzle, by making multiple sweeps of portions of the substrate that receive a thicker particle coating or by patterning the layer, for example, with a mask.

Thus, layers of materials, as described herein, may comprise particular layers that do not have the same planar extent as other layers. Thus, some layers may cover the entire substrate surface or a large fraction thereof while other layers cover a smaller fraction of the substrate surface. In this way, the layers can form one or more localized devices. At any particular point along the planar substrate, a sectional view through the structures may reveal a different number of identifiable layers than at other point along the surface. Generally, for optical applications, the particle coatings have a thickness in the range less than about 500 microns, in other embodiments, in the range less than about 250 microns, in additional embodiments in the range(s) from about 50 nanometers to about 100 microns and in further embodiments in the range(s) from about 100 nanometers to about 50 microns. A person of ordinary skill in the art will recognize that additional range(s) within these explicit ranges and subranges are contemplated and are encompassed within the present disclosure.

Consolidation to Form Optical Materials

Heat treatment can melt and fuse the particles and lead to compaction, i.e., densification, of the powders to form the desired material, such as an optical material. This fusing of the particles is generally referred to as consolidation. To consolidate, i.e., densify, the optical materials, the materials can be heated to a temperature above the melting point or the flow temperature, i.e., softening point, of the material to consolidate the coating into a smooth uniform material. Consolidation can be used to form amorphous or crystalline phases in layers. In general, consolidation can be performed before or after patterning of a layer. A preliminary heat treatment can be applied with the reactor flame to reduce dopant migration during the consolidation process. Using the techniques described herein, doped glasses can be formulated into planar optical devices.

Generally, the heating is performed under conditions to melt the particles into a viscous liquid. To form the viscous liquid, crystalline particles are heated above their melting point and amorphous particles are heated above their softening point. Because of the high viscosity, the material does not flow significantly on the substrate surface. Processing at higher temperatures to reduce the viscosity of the melt can result in undesirable melting of the substrate, migration of compositions between layers or in flow from a selected area of the substrate. The heating and quenching times can be adjusted to change the properties of the consolidated coatings, such as density. In addition, heat treatment can remove undesirable impurities and/or change the stoichiometry and crystal structure of the material.

Following deposition of the powder layer, the precursors can be shut off such that the reactant stream only comprises a fuel and an oxygen source that reacts to form a product without particles. The flame resulting from the reaction of the fuel and oxygen source can be used to heat the coated substrate. Such a heating step is observed to reduce dopant migration upon full consolidation of a doped silica glass. A flame heating step can be perform between coating steps for several layers prior to a heat treatment to fully consolidate the material.

Suitable processing temperatures and times generally depend on the composition of the particles. Small particles on the nanometer scale generally can be processed at lower temperatures and/or for shorter times relative to powders with larger particles due to lower melting points for the nanoparticles in comparison with bulk material. However, it may be desirable to use a comparable melting temperature to obtain greater surface smoothness from improved melting of the nanoparticles.

For the processing of silicon oxide nanoparticles, the particle coatings can be heated to a temperature from about 800° C. to 1700° C., although with silicon substrates the upper limit is about 1350° C. Higher temperatures can be reached with appropriate ceramic substrates. Dopants in the silicon oxide particles can lower the appropriate consolidation temperatures. Thus, the dopant can be selected to flow into a uniform optical material at a lower temperature. Suitable dopants to lower the flow temperature when placed into silicon oxide ($SiO_2$) include, for example, boron, phosphorous, germanium, and combinations thereof. The amount and composition of one or more dopants can be selected to yield a desired flow temperature for consolidation and index-of-refraction of the consolidated optical material.

Heat treatments can be performed in a suitable oven. It may be desirable to control the atmosphere in the oven with respect to pressure and/or the composition of the gases. Suitable ovens comprise, for example, an induction furnace or a tube furnace with gas flowing through the tube. The heat treatment can be performed following removal of the coated substrates from the coating chamber. In alternative embodiments, the heat treatment is integrated into the coating process such that the processing steps can be performed sequentially in the apparatus in an automated fashion.

For many applications, it is desirable to apply multiple particle coatings with different compositions. In general, these multiple particle coatings can be arranged adjacent to each other across the x-y plane of the substrate being coated (e.g., perpendicular to the direction of motion of the substrate relative to the product stream), or stacked one on top of the other across the z plane of the substrate being coated, or in any suitable combination of adjacent domains and stacked layers. Each coating can be applied to a desired thickness.

For optical applications in some embodiments, silicon oxide and doped silicon oxide can be deposited adjacent each other and/or in alternating layers. Similarly, distinct layers of silicon oxide with different dopants can be deposited in alternating layers. Specifically, two layers with different compositions can be deposited with one on top of the other, and or additionally or alternatively, with one next to the other, such as layer A and layer B formed as AB. In other embodiments, more than two layers each with different compositions can be deposited, such as layer A, layer B and layer C deposited as three sequential (e.g., stacked one on top of the other, or adjacent to the other, or adjacent and stacked) layers ABC. Similarly, alternating sequences of layers with different compositions can be formed, such as ABAABAB . . . or ABCABCABC . . . .

Individual uniform layers after consolidation generally have an average thickness in the range of less than 100 microns, in many embodiments in the range from about 1 micron to about 50 microns, in other embodiments in the range from about 3 microns to about 20 microns. A person of skill in the art will recognize that ranges within these specific ranges are contemplated and are within the scope of the present disclosure. Thickness is measured perpendicular to the projection plane in which the structure has a maximum surface area.

The material with multiple particle coatings can be heat treated after the deposition of each layer or following the deposition of multiple layers or some combination of the two approaches. The optimal processing order generally would depend on the melting point of the materials. Generally, however, it is desirable to heat treat and consolidate a plurality of layers simultaneously. Specifically, consolidating multiple layers simultaneously can reduce the time and complexity of the manufacturing process and, thus, reduce manufacturing costs. If the heating temperatures are picked at reasonable values, the melted materials remain sufficiently viscous that the layers do not merge undesirable amounts at the interface. Slight merging of the layers generally does not affect performance unacceptable amounts. By changing reaction conditions, particles can be deposited with changing particle size in the z-direction within a single layer or between layers. Thus, smaller particles can be deposited on top of larger particles. Since the smaller particles generally soften at lower temperatures, the consolidation of the upper layer can be less likely to damage the lower layers during the consolidation step. To form patterned structures following deposition, patterning approaches, such as lithography and photolithography, along with etching, such as chemical etching or radiation-based etching, can be used to form desired patterns in one or more layers. This patterning generally is performed on a structure prior to deposition of additional material. Patterning can be performed on particle layers or consolidated layers.

Photosensitive Material in Device Formation

Photosensitive optical material can be integrated into an optical structure, such as a planar optical structure, to impart a selected index-of-refraction to the photosensitive material. The resulting index-of-refraction determines the optical performance of the photosensitive material within the optical structure. In some embodiments, the activation is performed with light that is not patterned. Even if the light is not patterned, the light may be directed to only a portion of the substrate. The photosensitive material itself may or may not be patterned. If the photosensitive material is patterned, it may be advantageous, in some embodiments, to also pattern the light.

It has been observed that some oxides absorb ultraviolet light and undergo a shift in index-of-refraction, generally to a higher value of index-of-refraction. As an alternative to using ultraviolet light, intense green to blue light can be used in which a two-photon absorption process yields an equivalent shift in index-of-refraction as ultraviolet absorption. This phenomenon has been used successfully to form gratings in optical fibers by either using a mask to form an alternating pattern or by using interfering coherent laser beams to form a pattern. Grating formation using interfering ultraviolet beams is described further in U.S. Pat. No. 4,807,950 to Glenn et al., entitled "Method For Impressing Gratings Within Fiber Optics," incorporated herein by reference. The formation of gratings using a mask is described further in U.S. Pat. No. 5,367,588 to Hill et al., entitled "Method Of Fabricating Bragg Gratings Using A Silica Glass Phase Grating Mask And Mask Used By Same," and in U.S. Pat. No. 5,604,829 to Bruesselbach, entitled "Optical Waveguide With Diffraction Grating And Method Of Forming The Same," both of which are incorporated herein by reference.

In particular, germania, i.e., germanium oxide, and germanium doped silicon oxide undergo permanent shifts in index-of-refraction upon absorption of ultraviolet light or visible light by a two-photon process. While not wishing to be limited by theory, it is thought that the photosensitivity is related to oxygen deficient centers in the glass. The index-of-refraction shift may be the result of formation of defect centers, small structural changes, optical damage or combinations thereof. Silicon oxide doped with cerium, praseodymium and europium exhibit photosensitivity, but significantly weaker than germanium doped glass. In general, the photosensitive optical material includes at least about 0.25 mole percent of the dopant metal/metalloid oxide which imparts the photosensitivity, in other embodiments at least about 0.5 mole percent, and in further embodiments at least about 1 mole percent metal/metalloid oxide. A person of ordinary skill in the art will recognize that other ranges and subranges within these explicit ranges are contemplated and are encompassed within the present disclosure. Standard optical fiber cores generally include about 3 to about 4 mole percent germanium oxide, although higher and lower dopant levels can be used to form a photosensitive optical material. Presumably, the light used in the optical devices has a wavelength that will not change the index-of-refraction of the optical materials in undesirable ways following formation of the optical materials. The optical structure can be covered or coated with an opaque material to prevent undesirable changes in index-of-refraction due to unexpected irradiation of the photosensitive optical material following processing of the optical structure.

The degree of the shift depends on the composition of the material and the amount of exposure, i.e., total fluence of the light. The material generally can be any material with an index-of-refraction that is sensitive to exposure to light. Generally, the index-of-refraction shift is in the range of at least about $1 \times 10^{-6}$, in other embodiments at least about $1 \times 10^{-5}$, in further embodiments at least about $1 \times 10^{-4}$, and in additional embodiments at least about $5 \times 10^{-4}$. A person of ordinary skill in the art will recognize that additional ranges and subranges within these explicit ranges are contemplated and are encompassed within the present disclosure.

Silicon oxide doped with germanium has an absorption band centered at 244 nm and a width of 35 nm. Index-of-refraction changes on the order of at least about $10^{-3}$ can be obtained. Also, loading with molecular hydrogen $H_2$ enhances the photosensitivity such that index-of-refraction shift of $10^{-2}$ units can be obtained. Loading of the optical material with molecular oxygen can be performed at low temperatures. An alternative method of hydrogen loading is described in U.S. Pat. No. 6,311,524 to Brennan, III et al., entitled "Accelerated Method For Increasing The Photosensitivity Of A Glassy Material," incorporated herein by reference. In the embodiments involving hydrogen loading, the hydrogen generally can dissipate following the shift in index-of-refraction.

In addition, tin doped optical glass has been found to exhibit strong photosensitivity and very stable index-of-refraction shifts. The tin doped glasses are photosensitive to wavelengths below 280 nm. Index-of-refraction changes on the order of $1 \times 10^{-3}$ have been obtained. The glasses generally are doped with tin oxide in the range(s) from about 1 to about 30 mole percent in a silicon oxide based glass with at least about 30 mole percent $SiO_2$. The glasses can be further doped with other material, such as, for example, $P_2O_5$, $B_2O_3$ and/or $GeO_2$. Photoactive tin doped glasses are described further in U.S. Pat. No. 6,160,944 to Payne et al, entitled "Optical Waveguide Device," incorporated herein by reference.

Total fluences of light for irradiating photosensitive materials can be on the range(s) from about 0.1 $J/cm^2$ to about 500 $J/cm^2$. A person of ordinary skill in the art will recognize that other ranges within this explicit range are contemplated and are within the present disclosure. Any intense light source with emissions in the desired wavelength range can be used to illuminate the material to induce the index-of-refraction shift. Suitable light sources include, for example, a pulsed (KrF) excimer laser for UV irradiation and an argon ion laser for visible irradiation, although non-laser light sources also are suitable for irradiating the photosensitive optical materials. The radiation intensity, whether pulsed or continuous, should be selected to be low enough that the structure of the glass is not damaged. Similarly, if the light is pulsed, the pulse rate is also selected such that the glass is not structurally damaged from the irradiation. For any of the embodiments, the photosensitive material can be covered with one or more materials that are approximately transparent to the light used to alter the index-of-refraction of the photosensitive material.

For the formation of index-of-refraction gradients from the photosensitive material, the intensity of the light can be attenuated as the light penetrates the material due to absorption of light by the material such that the intensity of light drops with a gradient in the material. This attenuation of light results in reduced photo-induced index-of-refraction change at deeper depths along the light path. The irradiation time and light intensity can be adjusted to produce the desired gradient. Additionally or alternatively, the dopant concentration imparting the photosensitivity can be deposited with a composition gradient within the photosensitive material. Then, uniform illumination at the light wavelength to shift the index-of-refraction will generate a gradient in index-of-refraction due to the gradient in photosensitivity corresponding with the composition gradient. The light induced index-of-refraction gradient may be superimposed on an index-of-refraction gradient resulting directly from the composition gradient. The composition gradient can be a continuous gradient or a step-wise gradient. The formation of composition gradients is described further above. Index-of-refraction gradients can be introduced into optical fibers, optical fiber preforms and/or planar optical devices.

Whether the gradient is introduced by attenuation of light or by a composition gradient, the gradient in index-of-refraction generally extends across a distance of at least about 1 micron and in further embodiments at least about 10 microns. The gradient in index-of-refraction generally is at least about $1 \times 10^{-8}$ index units per micron and in further embodiments at least about $1 \times 10^{-7}$ index units per micron. A person or ordinary skill in the art will recognize that other ranges and subranges within the explicit ranges are contemplated and are encompassed within the present disclosure.

Substrates of a planar optical structure can be identified as materials that can be optically isolated from materials that transmit light, i.e., non-optical materials. A substrate can be formed from silicon, alumina or other convenient flat materials. Common substrates are round wafers, although substrates that are square or other shapes can be used. While planar optical structures generally are formed on a substrate, the substrate can be subsequently removed. The formation of substrateless planar optical structures using release layers is described further in copending and commonly assigned U.S. patent application Ser. No. 09/931,977, now U.S. Pat. No. 6,788,866 to Bryan, entitled "Layer Materials On Substrates," incorporated herein by reference.

Regardless of whether or not a substrate is present, a planar optical structure has a planar aspect that is distinctly different from elongated optical fibers and the like. The planar aspect of the planar optical structures can be evaluated based on a planar projection of the structure having the largest projected surface area. This planar projection can be evaluated without complications due to surface features or the like. Generally, the planar structure has a maximum area planar projection with a surface area in the range(s) of at least about 1 $cm^2$, in other embodiments in the range(s) of at least about 10 $cm^2$, in further embodiments in the range(s) of at least about 25 $cm^2$, in additional embodiments in the range(s) of at least about 50 $cm^2$, and in some embodiments in the range(s) from about 1 $cm^2$ to about 1 $m^2$. A person of ordinary skill in the art will recognize that ranges and subranges within these explicit ranges are contemplated and are encompassed within the present disclosure.

In addition, the planar optical structures generally have planar projections with an aspect ratio in the range(s) of no more than about 20, in other embodiments in the range(s) of no more than about 10 and in other embodiments, in the range(s) of no more than about 5. A person of ordinary skill in the art will recognize that other ranges and subranges within these explicit ranges are contemplated and are encompassed within the present disclosure. The aspect ratio is the ratio of the length to width, where the length is the distance along the longest segment in the planar projection connecting two edge points and the width is the distance along the longest segment perpendicular to the length segment connecting two edge points. The aspect ratio can be about 1, which is the lowest value.

The planar nature of the layer can also be expressed in terms of the minimum edge-to-edge distance in the maximum area projection for segments passing through the center of the projected area. Generally, the minimum edge-to-edge distance is in the range(s) of at least about 1 cm, in many embodiments in the range(s) of at least about 2 cm, in other embodiments in the range(s) of at least about 5 cm and in some embodiments in the range(s) from about 1 cm to about 1 meter. A person of ordinary skill in the art will recognize that ranges and subranges within these explicit ranges are contemplated and are encompassed within the present disclosure. Rectangular structures are convenient with respect to placement of optical structures along the planar surface. Circular structures are convenient because of the availability of circular shaped substrates with very smooth surfaces.

In some embodiments, the changes in index-of-refraction can be introduced into an optical fiber or an optical fiber preform. Generally, for the pulling of fibers, the optical structure/preform is formed as an elongated structure. Preforms can be produced by light reactive deposition in the same way as other optical structures. The dimensions for the various layers can be adjusted to account for dimensional changes when the fiber is pulled. For the formation of preforms, it may be desirable to shape the substrate highly elongated in one dimension. The aspect ratio may range from about 1:5 to about 1:50, or in other embodiments from about 1:10 to about 1:25. A person of ordinary skill in the art will recognize that ranges and subranges within these explicit ranges are contemplated and are within the present disclosure.

Figure 14:
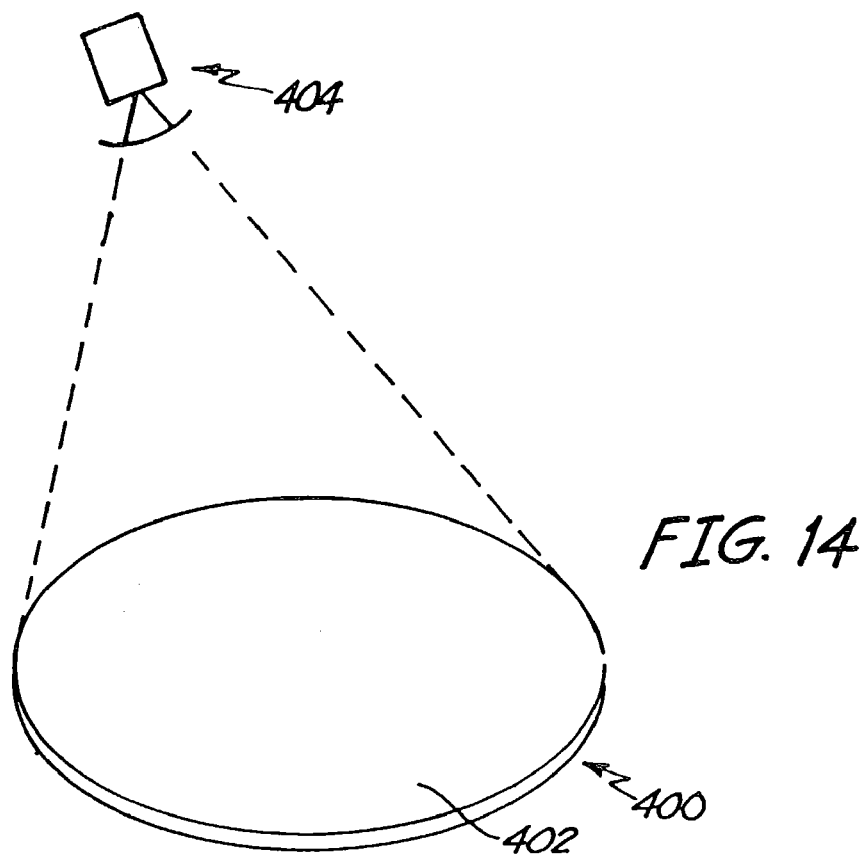
FIG. 14 is a perspective view of an optical structure with a layer of photosensitive optical material in an apparatus for irradiating the optical material in which a light source is configured to irradiate simultaneously all or a portion of the photosensitive material with un-patterned light.

In some embodiments, a layer of photosensitive optical material or a portion thereof is irradiated to shift the index-of-refraction of the optical material. Referring to FIG. 14, optical structure 400 has a layer 402 of photosensitive optical material. Layer 402 or a portion thereof can be irradiated with a defocused light source 404. For example, light source 404 can be a laser with a defocusing lens. For this particular embodiment, a portion of layer 402 can be irradiated with an appropriately aimed light source, but the light is not patterned, i.e., the light intensity is not structured within distances on the order of dimensions confining optical pathways/waveguides along the planar optical structure. Specifically, light that is not patterned does not have intense light regions spaced apart by low intensity regions with distances between the intense regions being in range(s) no more than about 1 millimeter microns, in other embodiments no more than about 250 microns, in further embodiments no more than about 100 microns, in additional embodiments no more than about 25 microns and in other embodiments no more than about 10 microns. Alternatively or additionally, light that is not patterned can be described as covering an extended area with no segment connecting two points on the perimeter of the extended area passing through the geometric center having a length no more than about 1 millimeter, in other embodiments, no more than about 0.25 millimeters, in further embodiments no more than about 100 microns, and in additional embodiments no more than about 10 microns. A person of ordinary skill in the art will recognize that other range(s) and subranges within these explicit ranges are contemplated and are encompassed within the present disclosure.

Figure 15:
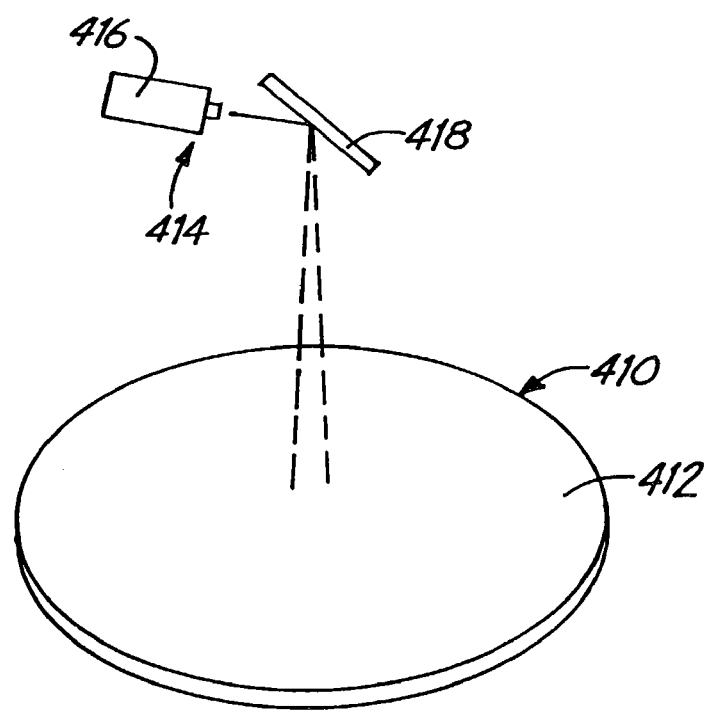
FIG. 15 is a perspective view of an optical structure with a layer of photosensitive optical material in an apparatus for irradiating the optical material in which a light source is configured to irradiate all or a portion of the photosensitive material with un-patterned light by scanning the surface with light using a light emitter or optical elements that move.

In alternative embodiments, a light source with a more focused beam can be scanned across the surface to approximately uniformly irradiate the surface or portion thereof. Referring to FIG. 15, planar optical structure 410 with a photosensitive layer 412 of optical material is irradiated by light source 414. Light source 414 includes a light emitter 416, such as a laser, and optical elements 418, such as a mirror, lenses, and a combination thereof. Light source 414, optical elements 416 or a combination thereof can be moved to scan the un-patterned light beam across layer 412 or portions thereof. The total fluence across the area is preferably about constant, such that the index-of-refraction shift is approximately constant over an extended region. If a focused beam is used, the depth of focus can be used to frequency shift a layer at a particular depth in the material relative to other depths.

Embodiments with approximately uniform irradiation across the substrate surface or portion thereof, such as the embodiments of FIGS. 14 and 15, are particularly useful for the formation of cladding materials. Thus, the index-of-refraction of the cladding material can be selection with irradiation following the formation of the layer of material. For example, an under-cladding of optical material can be used with different core materials by selecting an appropriate index-of-refraction of the under-cladding to provide for confined, single-mode transmission through the core material. Similarly, an over-cladding material can be applied over a range of core materials without altering the over-cladding composition. The index-of-refraction of the over-cladding can be selected by appropriate irradiation rather than by variation in composition. Cladding in the core layer can be photosensitive in comparable ways as the over-cladding material. This versatility in forming cladding with a selectable index-of-refraction can simplify some fabrication processes.

The embodiments shown in FIGS. 14 and 15 can be adapted for the formation of a gradient in index-of-refraction. The gradient in index-of-refraction can be established with a composition gradient in the photosensitive inducing dopant or with low intensity light that is attenuated within the optical material. Attenuation of light in a linear region with low or moderate absorption of the incident light is evaluated using Beer's Law. Based on Beer's law, the attenuation of the incident light is a linear function of the concentration of absorbing centers. Linear attenuation of the light should be effective to produce a linear gradient in index-of-refraction variation due to a corresponding linear decrease in light intensity through the thickness of the material.

Figure 16:
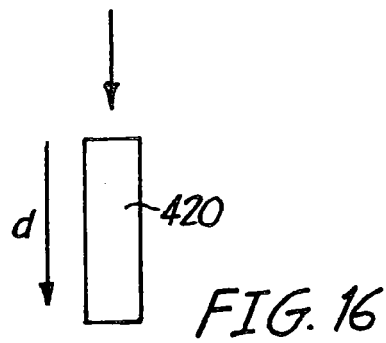
FIG. 16 is a fragmentary, sectional view of a photosensitive material being irradiated through the thickness of the photosensitive optical material with "d" indicating the depth in the material.
Figure 17:
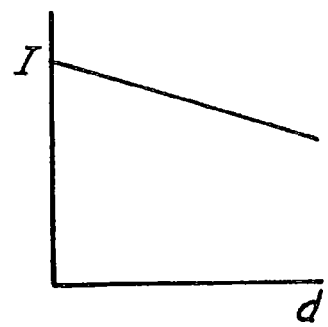
FIG. 17 is a schematic plot of linear attenuation of the light intensity as a function of depth d for the photosensitive material in FIG. 16.

Referring to FIG. 16, illumination of a cross section of photosensitive material 420 is depicted schematically, with "d" indicating the depth within photosensitive material 420. A plot in FIG. 17 indicates the approximate light intensity reaching a particular depth due to attenuation of the light from absorption. Attenuation of the light can result in non-linear attenuation if photosensitive material has greater absorption and/or if the light is weaker. If the scanning rate and/or the light intensity is varied, the apparatus in FIG. 15 can be made to generate step-wise gradients across the plane of the photosensitive optical material. The apparatus can be controlled to generate the desired form of gradient.

Figure 18:
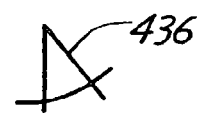
FIG. 18 is a perspective view of an optical material with patterned photosensitive material in an apparatus for irradiating the photosensitive optical material.
Figure 18:
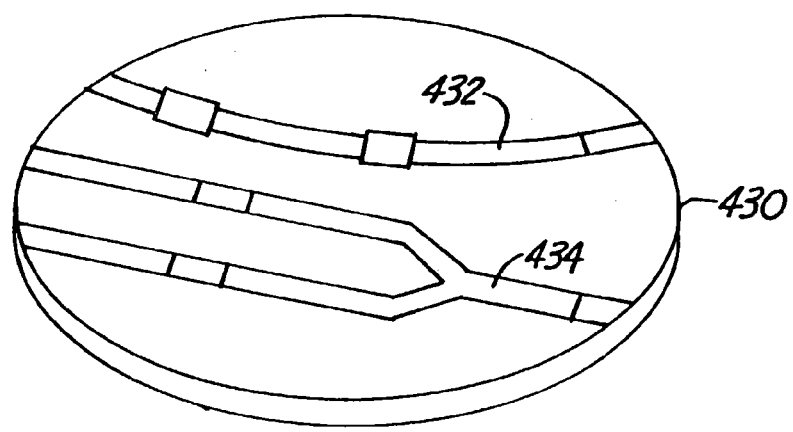

In some embodiments, the photosensitive optical material is patterned on the surface of the material. Un-patterned light can be used to shift the index-of-refraction of the patterned photosensitive material. For example, an increase in index-of-refraction due to irradiation can form a core material by increasing the index above the index of surrounding cladding material that is not photosensitive. Referring to FIG. 18, a planar optical structure 430 has optical circuits 432, 434. All or portions of optical circuits 432, 434 can be formed from photosensitive material. The entire surface can be illuminated with light source 436 which can be defocused to simultaneously illuminate planar optical structure 430 or to scan the light across the surface of planar optical structure 430.

Figure 19:
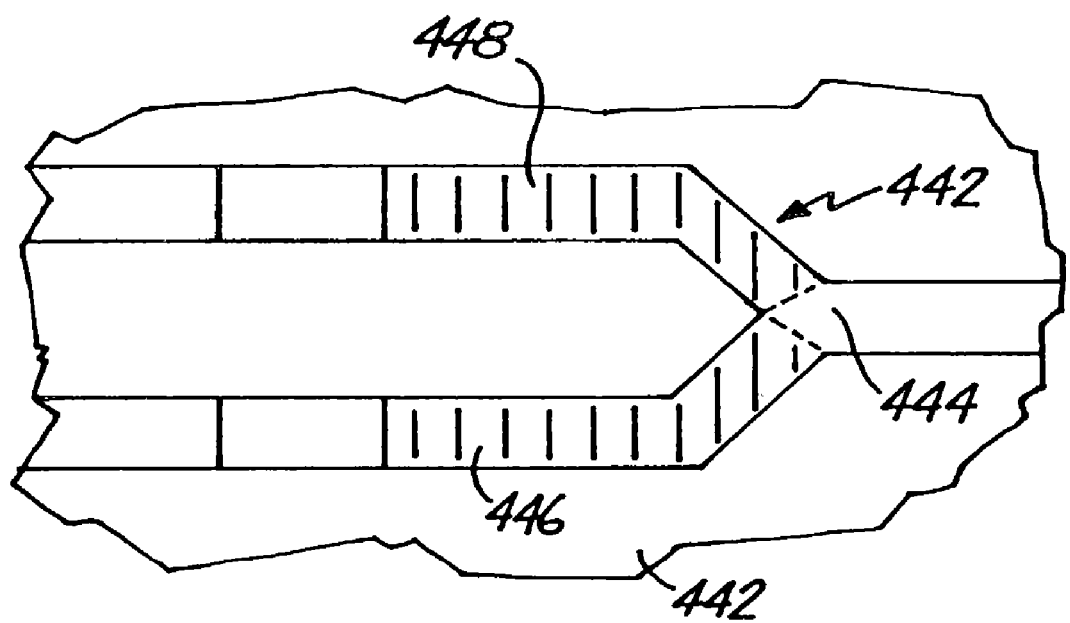
FIG. 19 is a fragmentary top view of an optical structure with patterned photosensitive optical material in which patterning of the irradiating light can be used to select one, the other or both of two optical pathway of an optical splitter.

In alternative embodiments, the light can be directed to only a portion of the planar optical structure. For example, in FIG. 18, only optical circuit 432 can be illuminated without illuminating optical circuit 434. Without illuminating optical circuit 434, optical circuit 434 cannot transmit confined light within the optical circuit. Using patterned light that is able to select portions of optical pathways for illumination more complex manipulations can be performed. For example, as shown in FIG. 19, an optical circuit 440 on optical structure 442 can include a beam splitter 444. Beam splitter 444 has branches 446, 448 formed with photosensitive material. Branch 446 optically connects with optical elements 450, 452 while branch 448 connects with optical elements 454, 456, which may be the same or different from 450, 452. Each optical circuit can include more or fewer optical devices of any particular functionality to achieve desired objectives. Patterned light can be used to increase the index-of-refraction of branch 446, branch 448 or both. The light induced increase in index-of-refraction can be used to convert the illuminated branch from a cladding material to a core material such that light in splitter 444 follows the selected branch(es), i.e., branch 446, 448 or both. By selectively activating potential core regions, different functionalities can be selected within the optical structure. The patterning of the light can be performed by photolithography techniques.

Surface Cutting of Silicon Oxide Structures

A thin film of silicon oxide is transferred from the surface of a silicon oxide wafer to a substrate. The thin film of silicon oxide is cleaved or cut from the initial silicon oxide wafer. Cutting involves the formation of a fracture band of weakened silicon oxide within the silicon oxide material and the application of energy to complete the cleavage at the weakened layer. The substrate is contacted with the thin film of silicon oxide before or after cleavage to transfer the silicon oxide thin layer to the substrate surface. Thus, this is a technique for the formation of an insulating silicon oxide layer on top of a variety of substrate surfaces. The silicon oxide can form a glass, following heating if necessary, that has desirable optical properties.

The initial wafer material has a surface formed from silicon oxide. The entire wafer can be silicon oxide or a relatively thick surface layer is formed of silicon oxide, such that a thin layer of silicon oxide can be cleaved off from the silicon oxide material by forming a rupture within silicon oxide. The silicon oxide material can be doped, if desired. Suitable dopants include, for example, titanium oxide, tantalum oxide, tin oxide, niobium oxide, zirconium oxide, aluminum oxide, lanthanum oxide, germanium oxide, boron oxide or combinations thereof. Commercially available silicon oxide wafers are suitable for the practice of the invention. Preferred substrates for receiving the silicon oxide layer include a variety of inorganic materials including, for example, silicon, metal oxides, metal nitrides and metal carbides.

Several approaches developed for the cleavage of silicon layers from a silicon substrate can be adapted for the cleavage of silicon oxide. In particular, ion implantation can be used to cleave a thin layer of silicon oxide from the wafer. Using these approaches, ions, radicals or impurities generally are implanted at a range of depths below the surface of the silicon oxide to form a fracture band at approximately the average penetration depth.

Using ion implantation, ions are directed at the wafer surface with selected energies to create microbubbles or microcavities at a selected depth within the wafer. The microbubbles/microcavities are located at approximately the mean penetration depth of the ions. Hydrogen ions or rare gas ions are preferably used for implantation. A variety of ion implantation apparatuses are commercially available since ion implantation is commonly used for material modification. The use of ion implantation for the generation of a layer of microbubbles/microcavities to fracture a layer is described further in U.S. Pat. No. 5,993,677 to Biasse et al., entitled "Process For Transferring a Thin Film From An Initial Substrate Onto a Final Substrate," incorporated herein by reference.

The implanted ions, radicals or other impurities form a cleavage point or fracture band in the wafer for further processing. Cleavage energy is supplied to the wafer to complete the cleavage at the weakened fracture band. The cleavage energy can be supplied before or after the wafer is contacted with a substrate to which the cleaved layer is to be transferred.

The cleavage energy can be supplied by heating the wafer, for example, in an oven, or by supplying mechanical energy. Suitable temperatures for cleaving the fracture band generally range from about 400° C. to about 800° C. Mechanical energy can be supplied as ultrasonic vibrations or mechanical vibrations.

In alternative embodiments, light energy is used to supply the cleavage energy. Silicon oxide of the wafer can be in a glass form that is transparent or mostly transparent to selected light wavelengths. The deposited ions/radicals will have an altered absorption profile relative to the silicon oxide above the fracture band. Thus, a suitable light wavelength can be directed through the silicon oxide to be selectively and primarily absorbed by the fracture band. Generally, visible light is suitable, and the light can be supplied by a laser or other intense light source. The light can be scanned across the wafer surface, the light can be shined across the entire wafer surface at once. Selective absorption at the fracture band will selectively cleave the wafer without heating the entire wafer. Thus, the process is not a thermal process. This process can be adapted for the cleavage of materials other than silicon oxide by selecting a light wavelength that is primarily transmitted through a transfer layer above the fracture band at the surface of the material and selectively absorbed by the fracture band and/or impurities localized in the fracture band.

To complete the transfer of the cleaved layer to the substrate surface, the substrate must be contacted with attractive forces to the wafer surface. Sufficient attractive forces can be applied through, for example, self-bonding, adhesive bonding or electro-static bonding. Self-bonding can be achieved by chemically activating one or both surfaces. Suitable adhesives include, for example, epoxies, polyimides, siloxanes and silicates, which can be dispersed with solvents. Adhesives can be heat cured, if appropriate. Electro-static bonding involves the use of surface charge to attract the two surfaces.

Following the transfer of the silicon oxide layer from the wafer to the substrate, additional processing can be performed. For example, the substrate with the transferred silicon oxide layer can be heat treated to improve the optical qualities of the silicon oxide glass. Also, the transferred silicon oxide can be polished, for example, with chemical-mechanical polishing, to smooth the transferred layer. The silicon oxide layer can be etched to form patterns of the silicon oxide. In particular, to form patterned structures, patterning approaches, such as photolithography, along with etching, such as chemical etching or radiation-based etching, can be used to form desired patterns in one or more layers. For example, planar optical waveguides can be formed. Additional layers can be transferred or deposited onto the transferred silicon oxide before or after additional processing, as described above.

As utilized herein, the term "in the range(s)" or "between" comprises the range defined by the values listed after the term "in the range(s)" or "between", as well as any and all subranges contained within such range, where each such subrange is defined as having as a first endpoint any value in such range, and as a second endpoint any value in such range that is greater than the first endpoint and that is in such range.

The embodiments described above are intended to be illustrative and not limiting. Additional embodiments are within the claims below. Although the present invention has been described with reference to specific embodiments, workers skilled in the art will recognize that changes may be made in form and detail without departing from the spirit and scope of the invention.

What we claim is:

1. A method for producing a gradient in index-of-refraction in an optical material comprising a photosensitive optical material, the method comprising irradiating the photosensitive optical material to create a light-induced gradient in index-of-refraction, wherein the irradiating of the photosensitive optical material is performed for a selected period of time with light having an intensity and wavelength to induce the gradient in index-of-refraction along the direction of the irradiating, the gradient in index-of-refraction at least about $1 \times 10^{-8}$ index units per micron.

2. The method of claim 1 wherein the optical material comprises a planar optical structure.

3. The method of claim 2 wherein the gradient in index-of-refraction is oriented along the plane of the structure.

4. The method of claim 2 wherein the gradient in index-of-refraction is oriented perpendicular to the plane of the structure.

5. The method of claim 1 wherein the optical material comprises an optical fiber preform or portion thereof with an aspect ratio of at least about 5.

6. The method of claim 1 wherein the photosensitive optical material comprises at least about 1 mole percent germanium as a fraction of the total metal/metalloid content of the photosensitive optical material.

7. The method of claim 1 wherein the light intensity and the composition of the photosensitive material produce absorption of the light in the linear Beer's law regime of spatial variation.

8. The method of claim 1 wherein the light intensity and the composition of the photosensitive material produce absorption of the light with non-linear spatial variation.

9. The method of claim 1 wherein the photosensitive optical material comprises a gradient in composition of a dopant that induces photosensitivity of the material wherein the composition gradient results in the index-of-refraction gradient following illumination.

10. The method of claim 1 wherein the gradient in index-of-refraction extends across a distance of at least about 10 microns.

11. A method for producing a gradient in index-of-refraction in an optical material comprising a photosensitive optical material, the method comprising irradiating the photosensitive optical material to create a light-induced gradient in index-of-refraction, wherein the photosensitive optical material comprises a gradient in composition of a dopant that induces photosensitivity of the material wherein the composition gradient results in the index-of-refraction gradient following the irradiating.

12. The method of claim 11 wherein the optical material comprises a planar optical structure.

13. The method of claim 12 wherein the gradient in index-of-refraction is oriented along the plane of the structure.

14. The method of claim 12 wherein the gradient in index-of-refraction is oriented perpendicular to the plane of the structure.

15. The method of claim 11 wherein the optical material comprises an optical fiber preform or portion thereof with an aspect ratio of at least about 5.

16. The method of claim 11 wherein the photosensitive optical material comprises at least about 1 mole percent germanium as a fraction of the total metal/metalloid content of the photosensitive optical material.

17. The method of claim 11 wherein the irradiating of the photosensitive optical material is performed for a selected period of time with light having an intensity and wavelength to induce the gradient index-of-refraction along the irradiation direction.

18. The method of claim 17 wherein the light intensity and the composition of the photosensitive material produce absorption of the light in the linear Beer's law regime of spatial variation.

19. The method of claim 17 wherein the light intensity and the composition of the photosensitive material produce absorption of the light with non-linear spatial variation.

20. The method of claim 11 wherein the gradient in index-of-refraction extends across a distance of at least about 10 microns.

21. The method of claim 11 wherein the gradient in index-of refraction is at least about $1 \times 10^{-8}$ index units per micron.

* * * * *

UNITED STATES PATENT AND TRADEMARK OFFICE
CERTIFICATE OF CORRECTION

PATENT NO. : 7,224,882 B2  Page 1 of 1
APPLICATION NO. : 10/620176
DATED : May 29, 2007
INVENTOR(S) : Michael Bryan and Nobuyuki Kambe It is certified that error appears in the above-identified patent and that said Letters Patent is hereby corrected as shown below:

Col. 24, Line 63, delete "Home" and insert --Horne--.

Signed and Sealed this

Thirty-first Day of March, 2009

JOHN DOLL
*Acting Director of the United States Patent and Trademark Office*